United States Patent
Ono

(10) Patent No.: US 9,395,522 B2
(45) Date of Patent: Jul. 19, 2016

(54) VARIABLE MAGNIFICATION OPTICAL SYSTEM AND IMAGING APPARATUS

(71) Applicant: FUJIFILM Corporation, Tokyo (JP)

(72) Inventor: Kazunori Ono, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 444 days.

(21) Appl. No.: 13/965,686

(22) Filed: Aug. 13, 2013

(65) Prior Publication Data

US 2013/0329121 A1  Dec. 12, 2013

Related U.S. Application Data

(63) Continuation of application No. PCT/JP2012/001597, filed on Mar. 8, 2012.

(30) Foreign Application Priority Data

Mar. 11, 2011 (JP) .................................. 2011-054076

(51) Int. Cl.
*G02B 15/14* (2006.01)
*G02B 15/16* (2006.01)
*G02B 15/177* (2006.01)

(52) U.S. Cl.
CPC .............. *G02B 15/14* (2013.01); *G02B 15/161* (2013.01); *G02B 15/177* (2013.01)

(58) Field of Classification Search
CPC ............. G02B 9/00; G02B 9/64; G02B 13/00; G02B 13/0005; G02B 13/001; G02B 13/0015; G02B 13/0045; G02B 15/00; G02B 15/14; G02B 15/16; G02B 15/161; G02B 15/177; G02B 15/20
See application file for complete search history.

(56) References Cited

U.S. PATENT DOCUMENTS 4,198,128 A * 4/1980 Ogino .................. G02B 15/177 359/681
5,539,581 A * 7/1996 Sato ...................... G02B 15/177 359/676

(Continued)

FOREIGN PATENT DOCUMENTS

JP  62-206517  9/1987
JP  9-061711  3/1997

(Continued)

OTHER PUBLICATIONS

International Search Report, PCT/JP2012/001597, Jun. 5, 2012.

(Continued)

*Primary Examiner* — Thong Nguyen
(74) *Attorney, Agent, or Firm* — Young & Thompson

(57) ABSTRACT

A variable magnification optical system consists of a negative first lens group, a stop that is fixed relative to an image plane during magnification change, and a positive second lens group, which are in this order from an object side. A distance between the first lens group and the second lens group in an optical axis direction becomes shorter when magnification is changed from a wide-angle end to a telephoto end. The first lens group consists of a positive lens having a convex object-side surface and two negative lenses, in this order from the object side. The variable magnification optical system satisfies the following formula (1) about Abbe number vd1 of the positive lens in the first lens group for d-line:

$$25.5 < vd1 < 50 \qquad (1).$$

16 Claims, 22 Drawing Sheets

(56) References Cited

U.S. PATENT DOCUMENTS

| | | | |
|---|---|---|---|
| 6,169,635 B1 * | 1/2001 | Ozaki | G02B 13/22 359/691 |
| 6,268,964 B1 * | 7/2001 | Ozaki | G02B 15/177 359/682 |
| 2008/0174880 A1 | 7/2008 | Shimizu | |

FOREIGN PATENT DOCUMENTS

| | | |
|---|---|---|
| JP | 10-104514 | 4/1998 |
| JP | 11-084237 | 3/1999 |
| JP | 2001-281543 | 10/2001 |
| JP | 2001-330773 | 11/2001 |
| JP | 2007-079108 | 3/2007 |
| JP | 2007-279335 | 10/2007 |

OTHER PUBLICATIONS

Chinese Office Action dated Mar. 10, 2015; Application No. 201280012868.2.

* cited by examiner

FIG.2
EXAMPLE 1
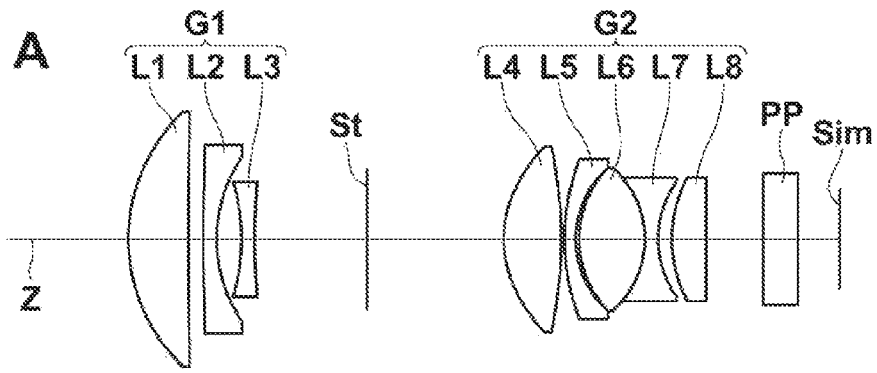
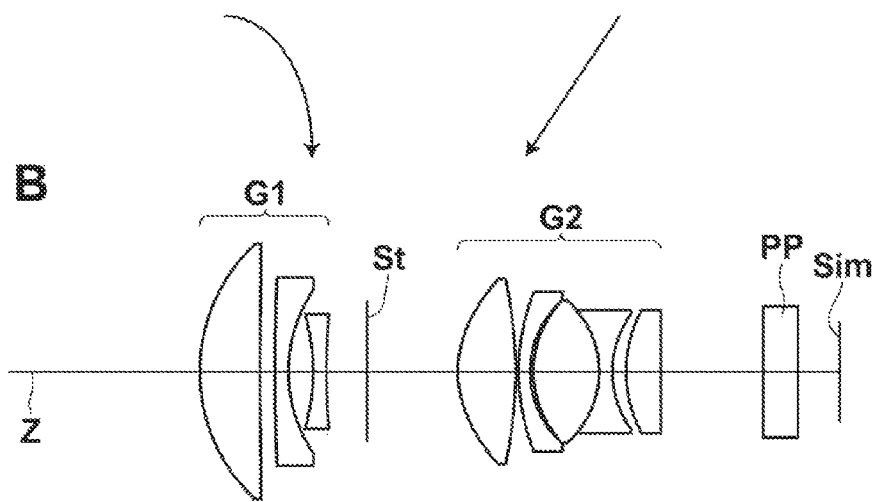
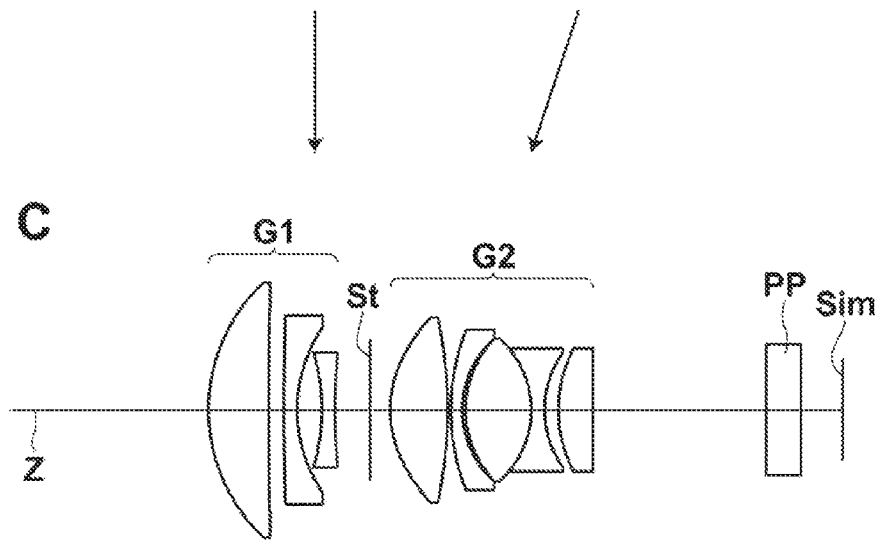

FIG.11
EXAMPLE 10
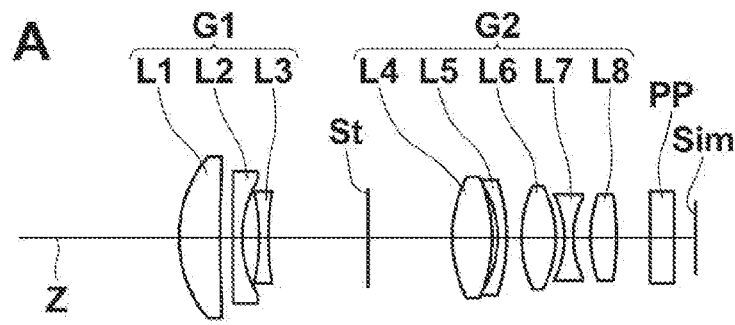
A
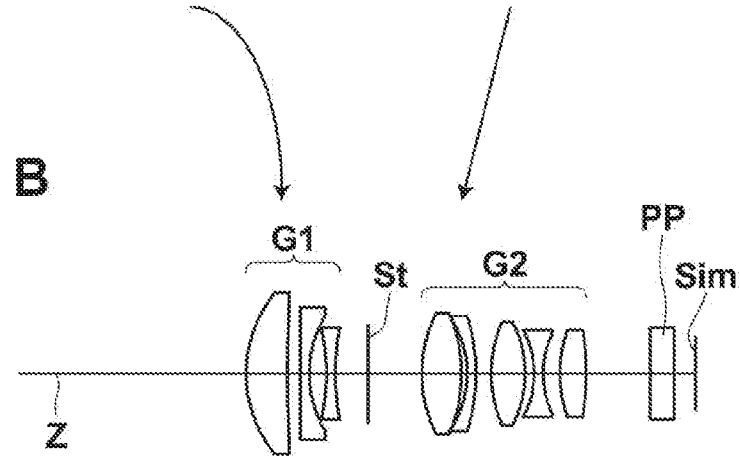
B
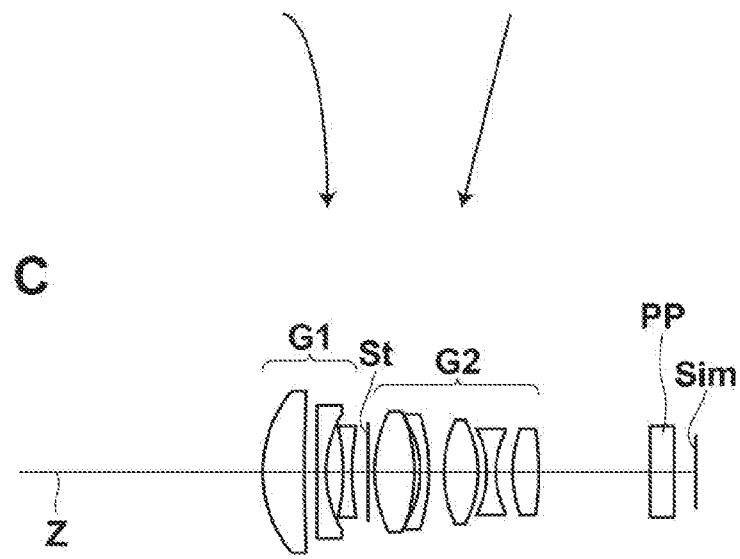
C

FIG.12
EXAMPLE 1
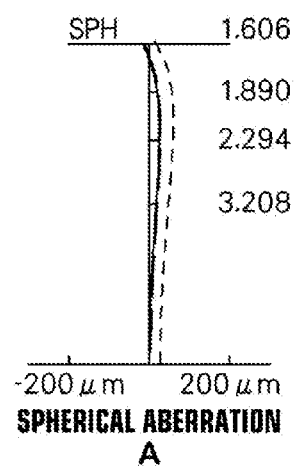
SPHERICAL ABERRATION
A
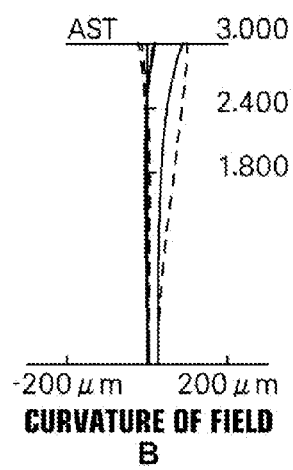
CURVATURE OF FIELD
B
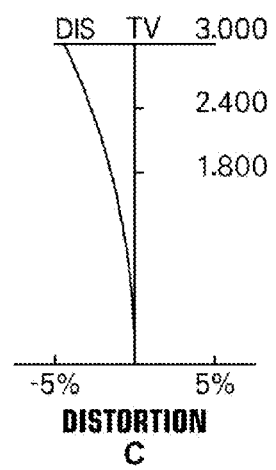
DISTORTION
C
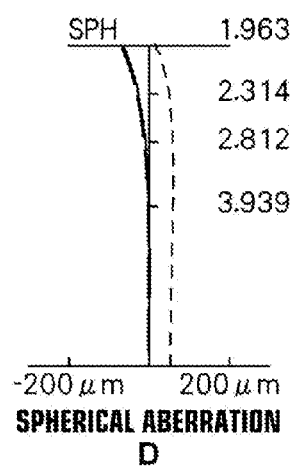
SPHERICAL ABERRATION
D
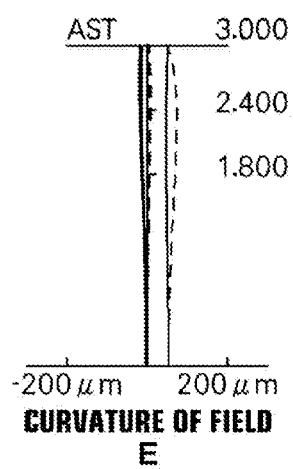
CURVATURE OF FIELD
E
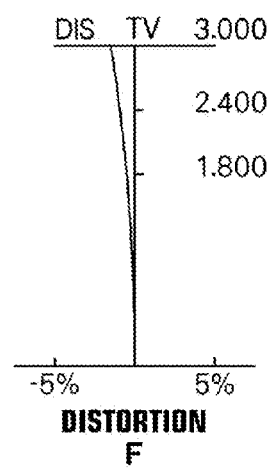
DISTORTION
F
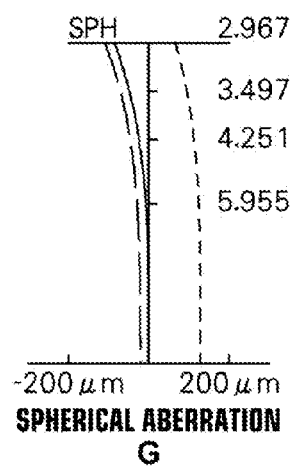
SPHERICAL ABERRATION
G
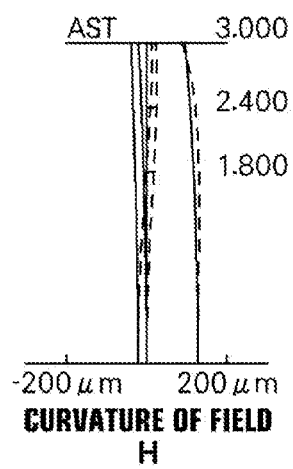
CURVATURE OF FIELD
H
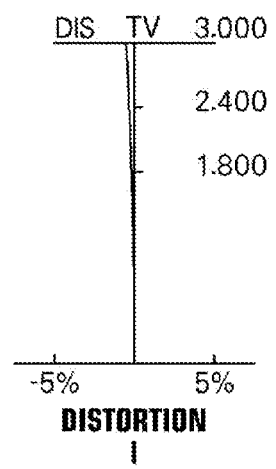
DISTORTION
I

FIG.13
EXAMPLE 2
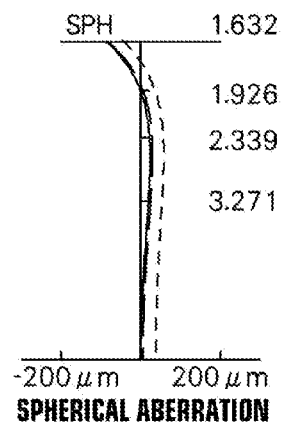
SPHERICAL ABERRATION
A
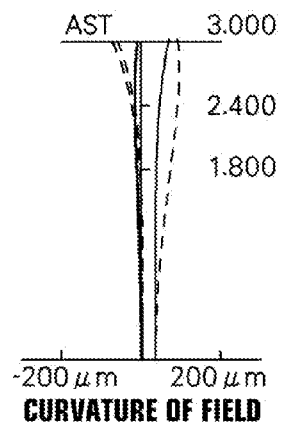
CURVATURE OF FIELD
B
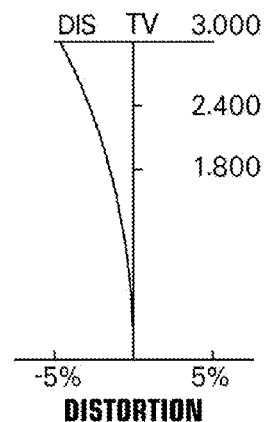
DISTORTION
C
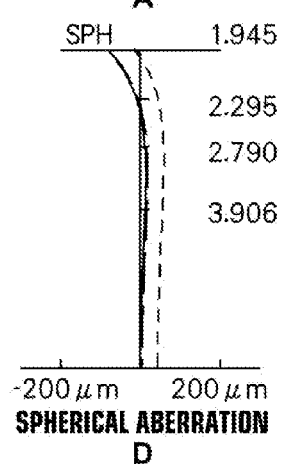
SPHERICAL ABERRATION
D
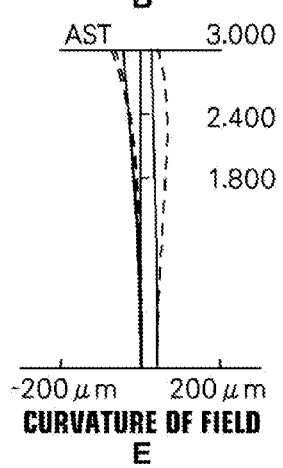
CURVATURE OF FIELD
E
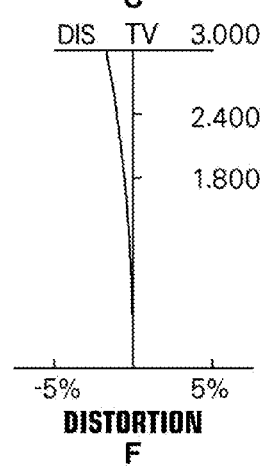
DISTORTION
F
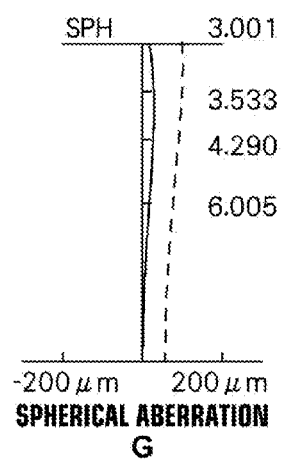
SPHERICAL ABERRATION
G
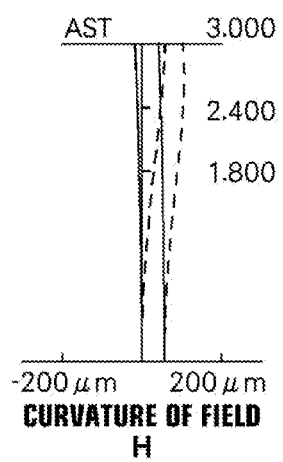
CURVATURE OF FIELD
H
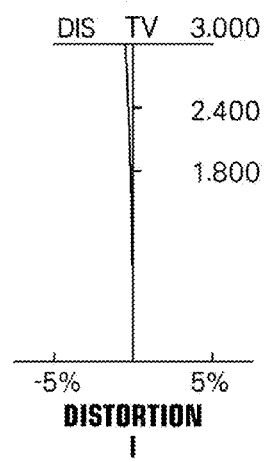
DISTORTION
I

FIG.14
EXAMPLE 3
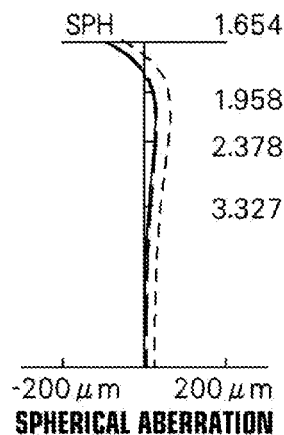
SPHERICAL ABERRATION
A
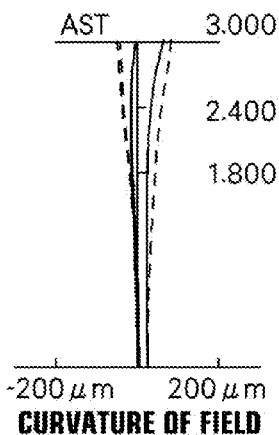
CURVATURE OF FIELD
B
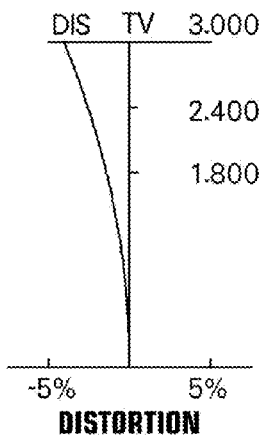
DISTORTION
C
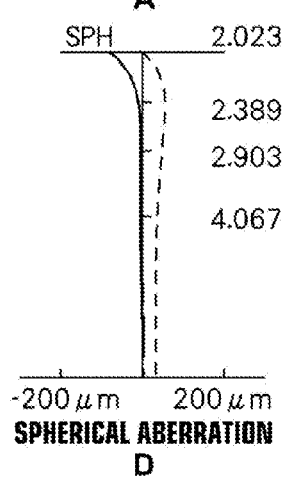
SPHERICAL ABERRATION
D
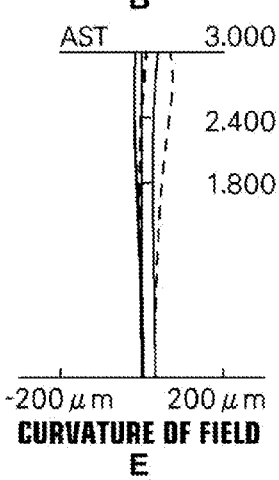
CURVATURE OF FIELD
E
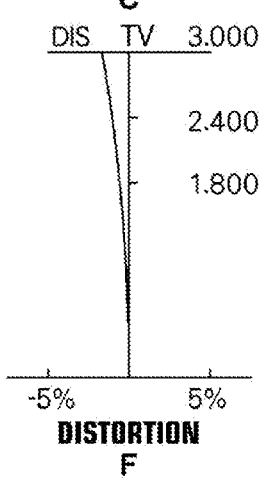
DISTORTION
F
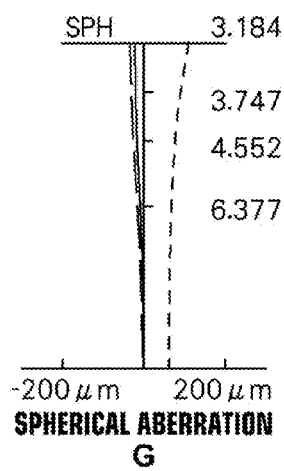
SPHERICAL ABERRATION
G
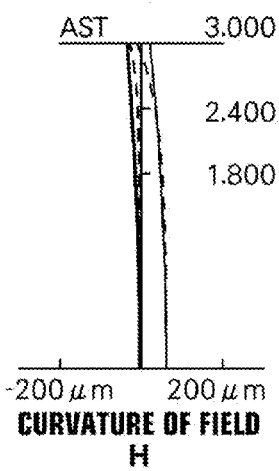
CURVATURE OF FIELD
H
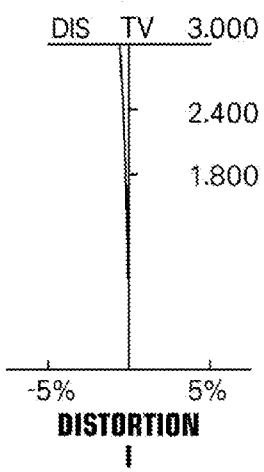
DISTORTION
I

FIG.15
EXAMPLE 4
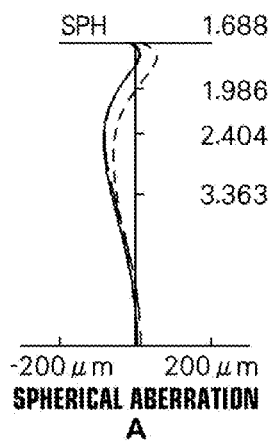
SPHERICAL ABERRATION
A
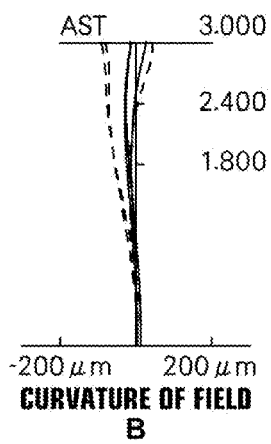
CURVATURE OF FIELD
B
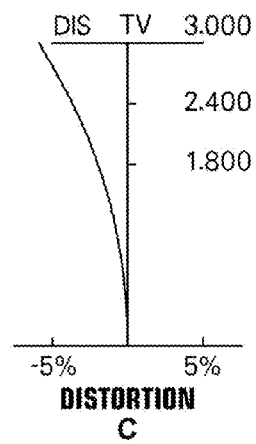
DISTORTION
C
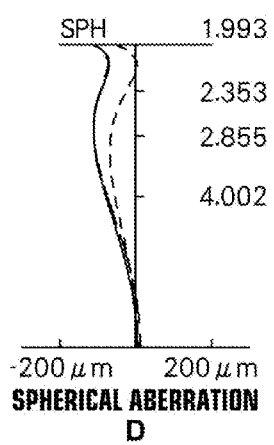
SPHERICAL ABERRATION
D
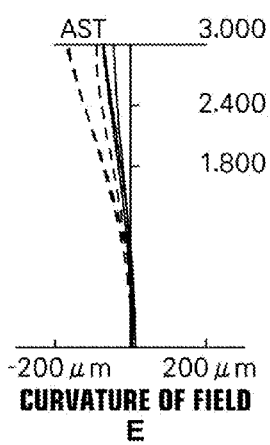
CURVATURE OF FIELD
E
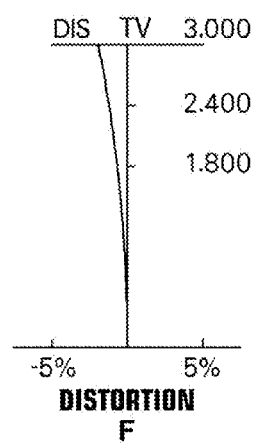
DISTORTION
F
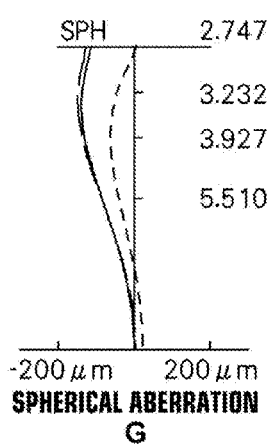
SPHERICAL ABERRATION
G
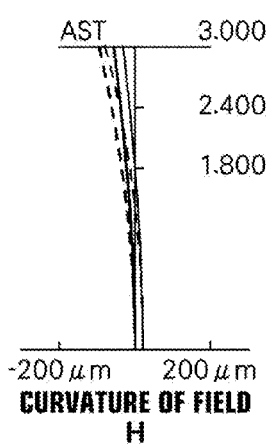
CURVATURE OF FIELD
H
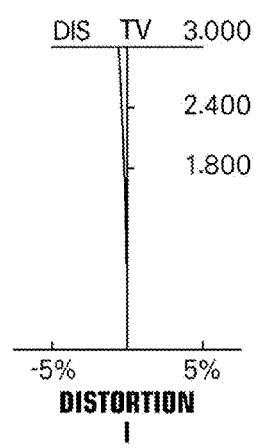
DISTORTION
I

FIG.16
EXAMPLE 5
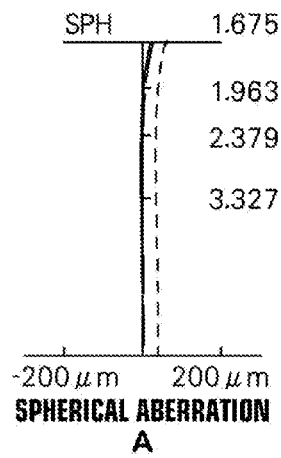
SPHERICAL ABERRATION
A
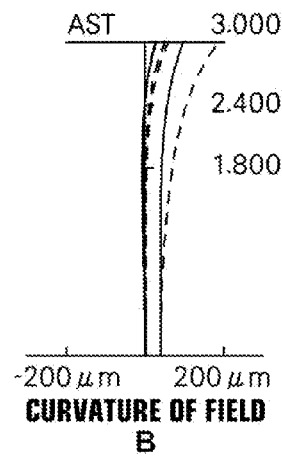
CURVATURE OF FIELD
B
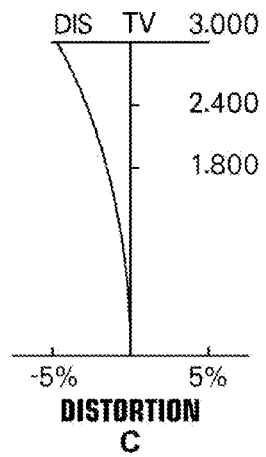
DISTORTION
C
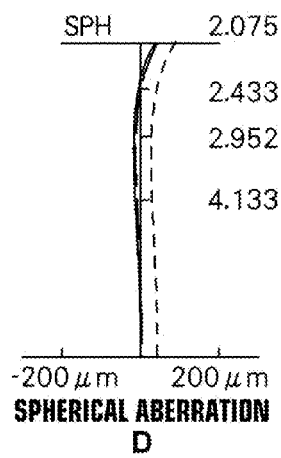
SPHERICAL ABERRATION
D
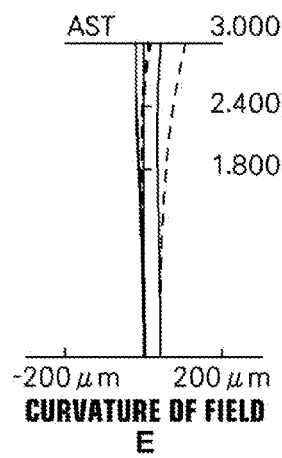
CURVATURE OF FIELD
E
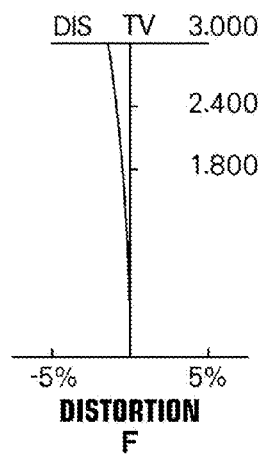
DISTORTION
F
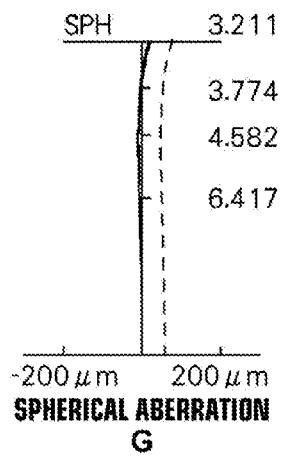
SPHERICAL ABERRATION
G
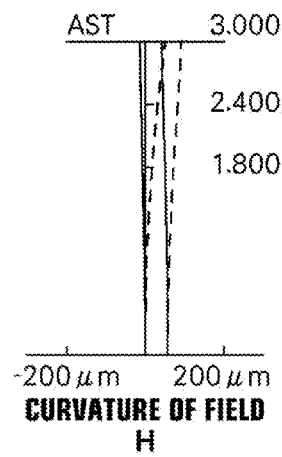
CURVATURE OF FIELD
H
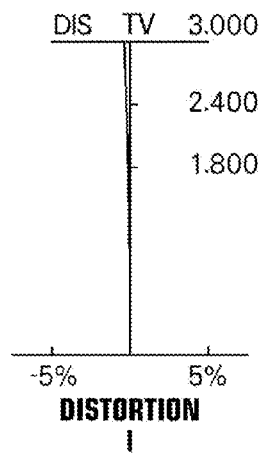
DISTORTION
I

FIG.17
EXAMPLE 6
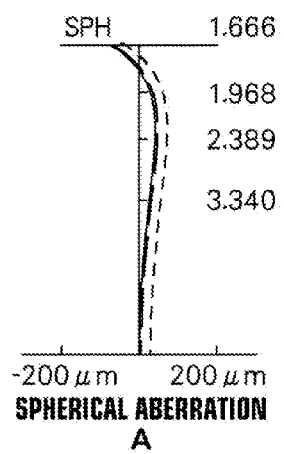
SPHERICAL ABERRATION
A
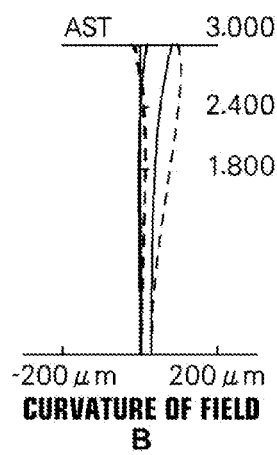
CURVATURE OF FIELD
B
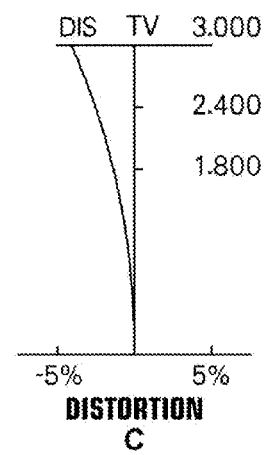
DISTORTION
C
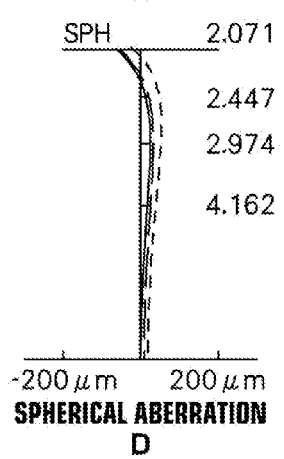
SPHERICAL ABERRATION
D
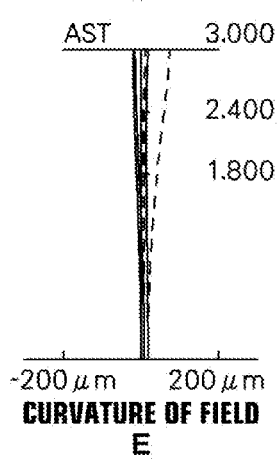
CURVATURE OF FIELD
E
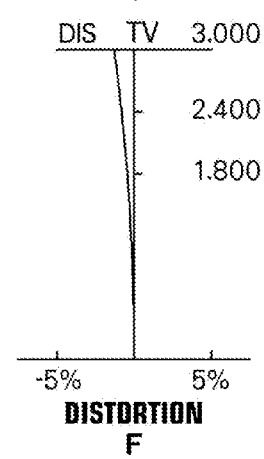
DISTORTION
F
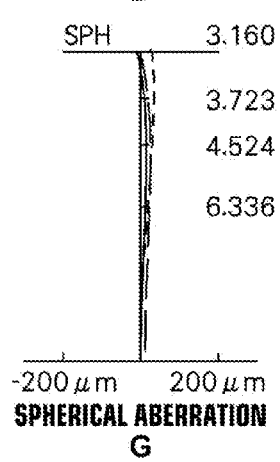
SPHERICAL ABERRATION
G
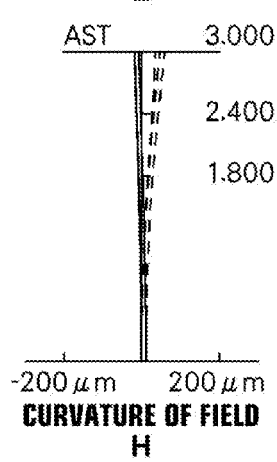
CURVATURE OF FIELD
H
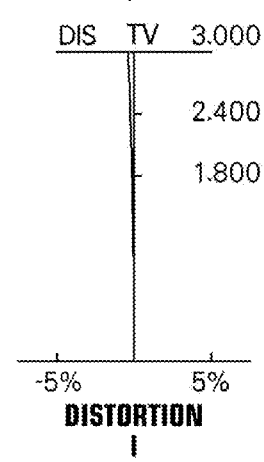
DISTORTION
I

FIG.18
EXAMPLE 7
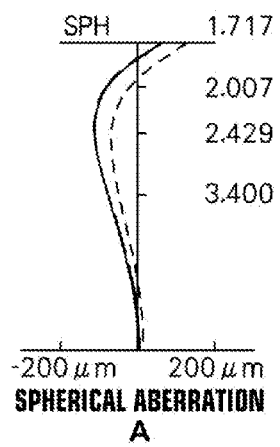
A
SPHERICAL ABERRATION
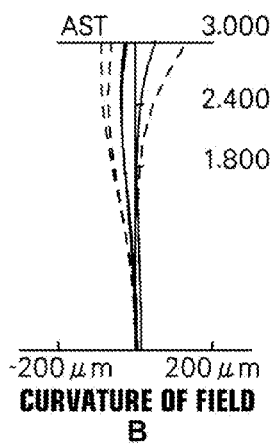
B
CURVATURE OF FIELD
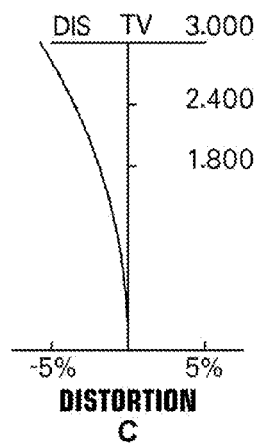
C
DISTORTION
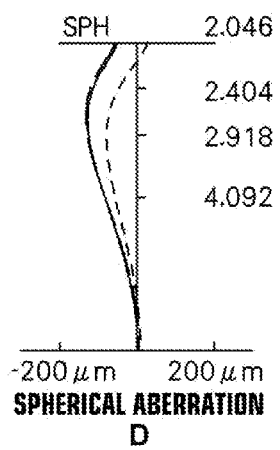
D
SPHERICAL ABERRATION
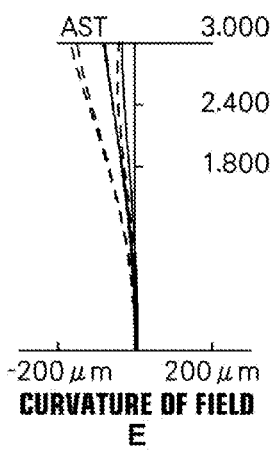
E
CURVATURE OF FIELD
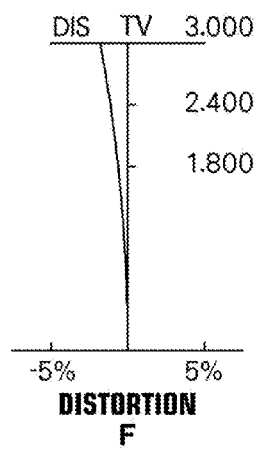
F
DISTORTION
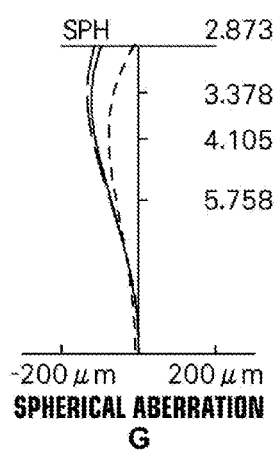
G
SPHERICAL ABERRATION
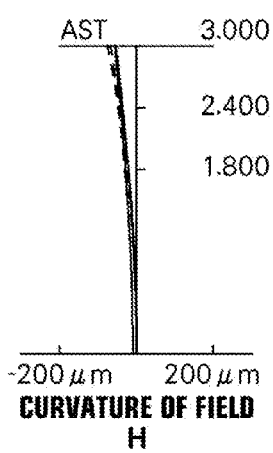
H
CURVATURE OF FIELD
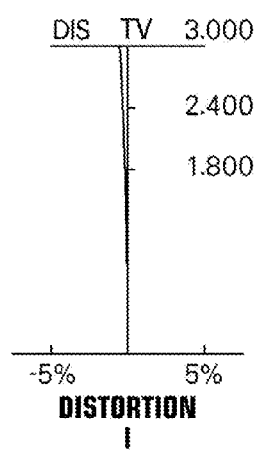
I
DISTORTION

FIG.19
EXAMPLE 8
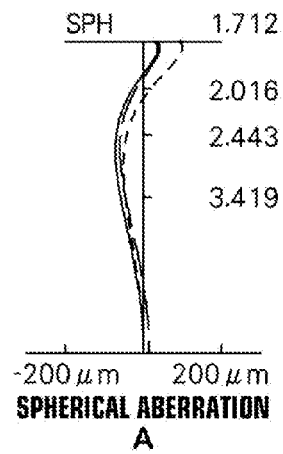
SPH 1.712
2.016
2.443
3.419
−200 μm   200 μm
SPHERICAL ABERRATION
A
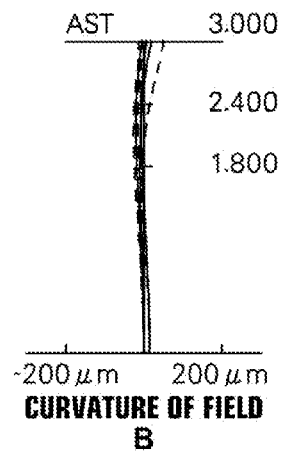
AST 3.000
2.400
1.800
−200 μm   200 μm
CURVATURE OF FIELD
B
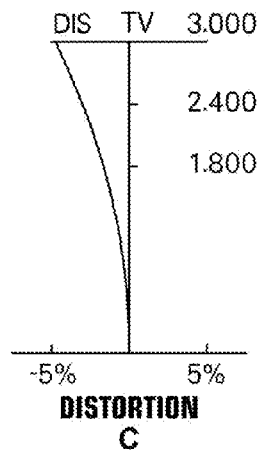
DIS TV 3.000
2.400
1.800
−5%   5%
DISTORTION
C
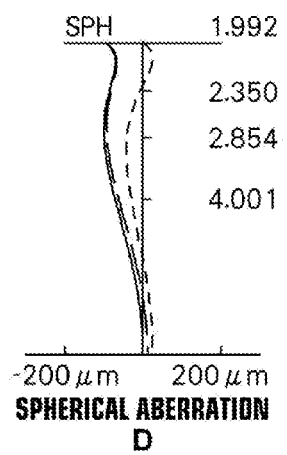
SPH 1.992
2.350
2.854
4.001
−200 μm   200 μm
SPHERICAL ABERRATION
D
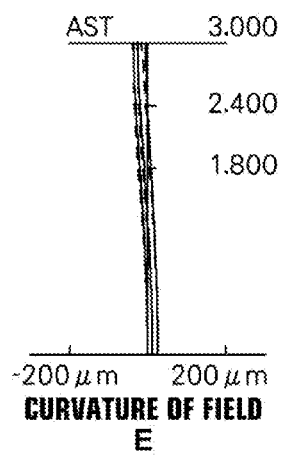
AST 3.000
2.400
1.800
−200 μm   200 μm
CURVATURE OF FIELD
E
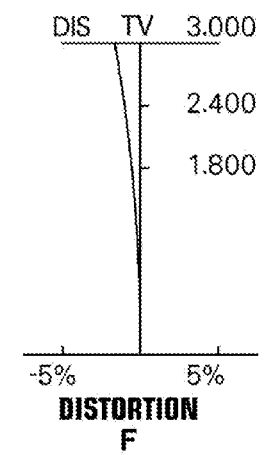
DIS TV 3.000
2.400
1.800
−5%   5%
DISTORTION
F
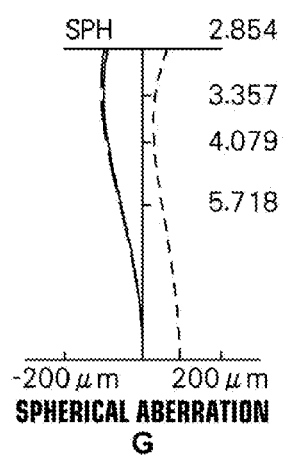
SPH 2.854
3.357
4.079
5.718
−200 μm   200 μm
SPHERICAL ABERRATION
G
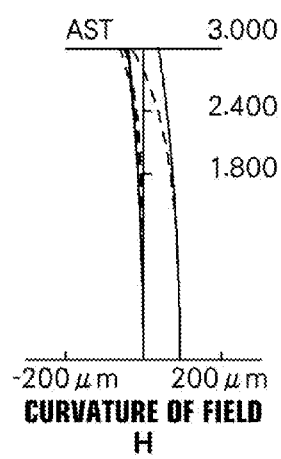
AST 3.000
2.400
1.800
−200 μm   200 μm
CURVATURE OF FIELD
H
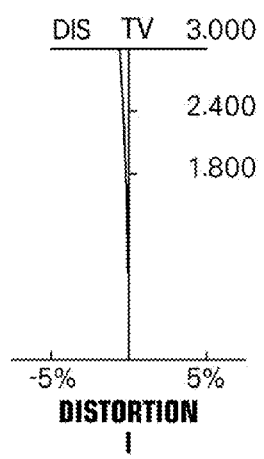
DIS TV 3.000
2.400
1.800
−5%   5%
DISTORTION
I

FIG.20
EXAMPLE 9
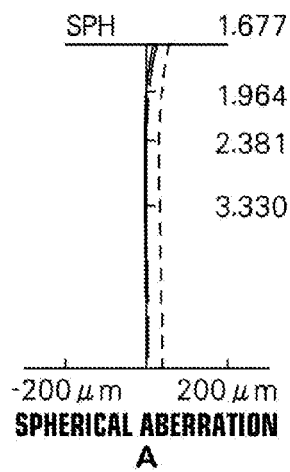
A SPHERICAL ABERRATION
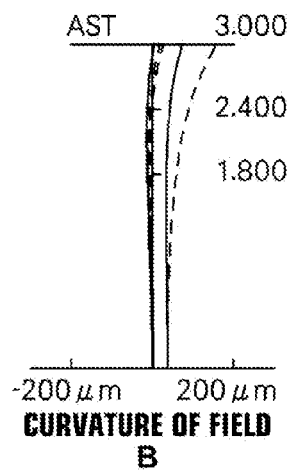
B CURVATURE OF FIELD
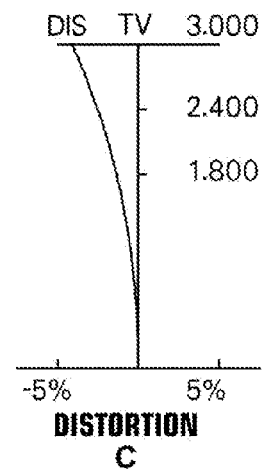
C DISTORTION
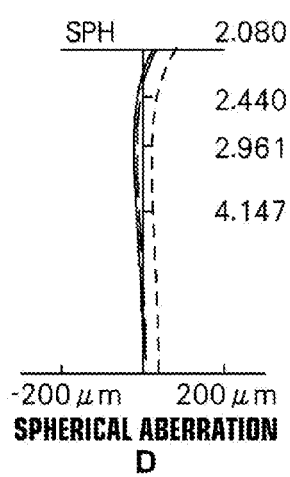
D SPHERICAL ABERRATION
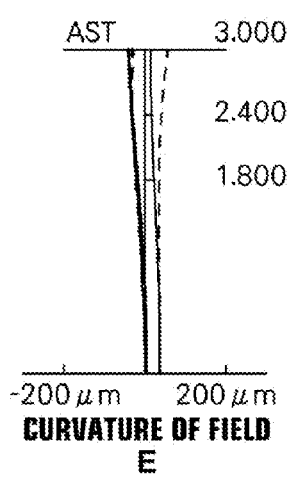
E CURVATURE OF FIELD
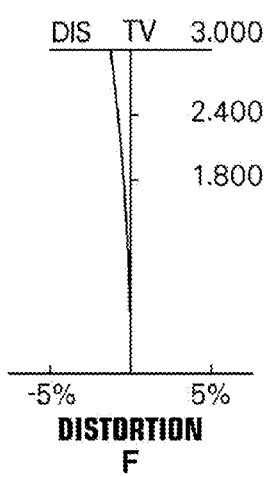
F DISTORTION
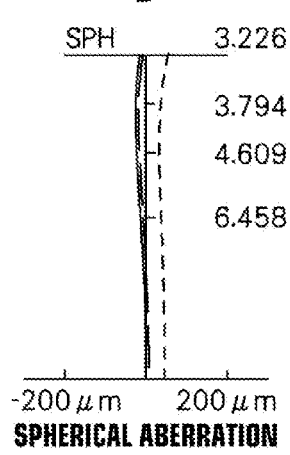
G SPHERICAL ABERRATION
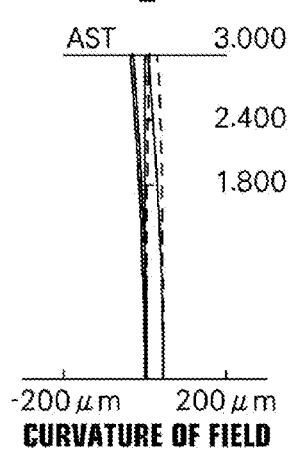
H CURVATURE OF FIELD
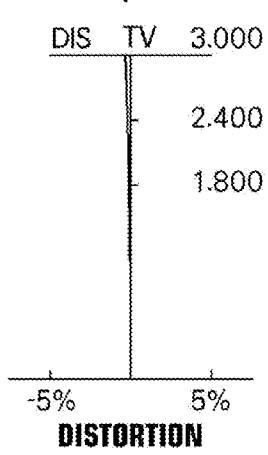
I DISTORTION

FIG.21
EXAMPLE 10
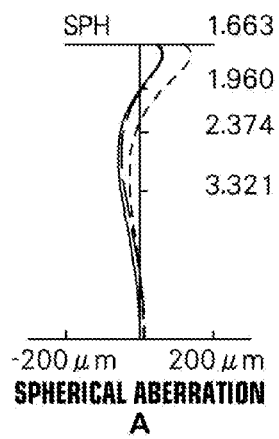
SPHERICAL ABERRATION
A
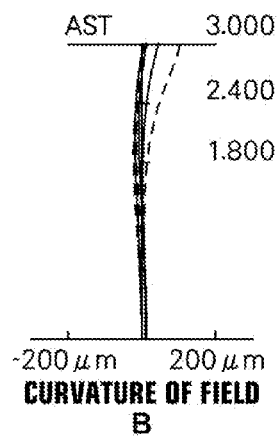
CURVATURE OF FIELD
B
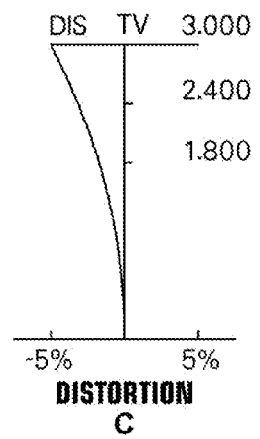
DISTORTION
C
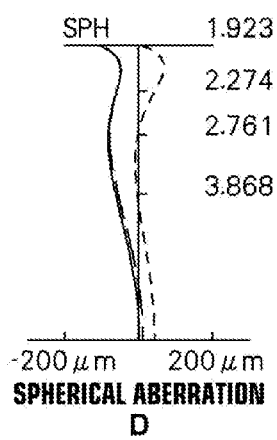
SPHERICAL ABERRATION
D
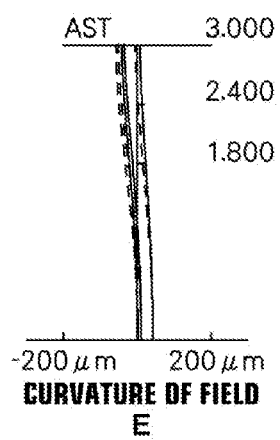
CURVATURE OF FIELD
E
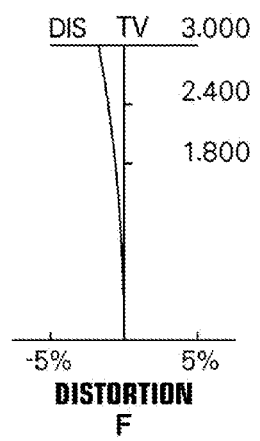
DISTORTION
F
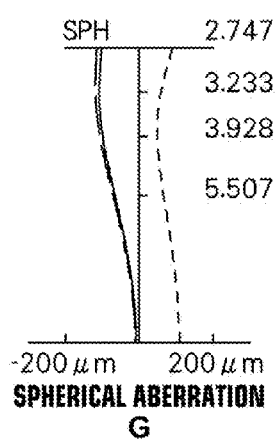
SPHERICAL ABERRATION
G
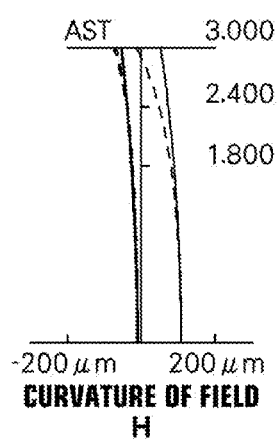
CURVATURE OF FIELD
H
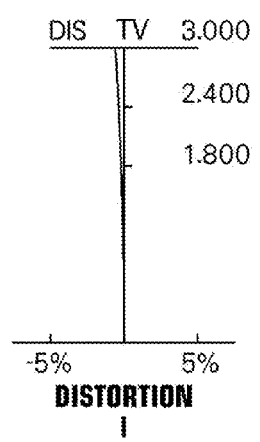
DISTORTION
I

VARIABLE MAGNIFICATION OPTICAL SYSTEM AND IMAGING APPARATUS

BACKGROUND OF THE INVENTION

1. Field of the Invention

The present invention relates to a variable magnification optical system and an imaging apparatus. In particular, the present invention relates to a variable magnification optical system that is usable in a video camera, an electronic still camera and the like, and appropriate especially for a surveillance camera, and an imaging apparatus including the variable magnification optical system.

2. Description of the Related Art

Conventionally, surveillance cameras have been used to prevent crimes, to record and the like, and variable magnification optical systems for CCTV (Closed-circuit Television) have been used, as optical systems for surveillance cameras. Such variable magnification optical systems for CCTV need to have compact lens structure and to be producible at low cost. Further, the specifications of the variable magnification optical systems need to be able to cover a high angle-of-view region through a standard angle of view, and the variable magnification optical systems need to be resistant to conditions in indoor and outdoor use. Therefore, two-group zoom lenses that satisfy these requirements, and the structure of which is relatively simple, have been adopted in many cases.

As compact two-group zoom lenses, a two-group zoom lens composed of a positive group and a negative group, and in which positive refractive power precedes, was intensely developed in the era of silver halide film cameras. In such a zoom lens, a positive first group and a negative second group are arranged in this order from an object side. However, in this type of zoom lens, an aperture stop is integrated with the positive first group to make the zoom lens compact, and the length of the entire lens system is short at a wide-angle end, and long at a telephoto end. In most surveillance cameras, the size of a casing of the surveillance camera is fixed. Therefore, when this type of zoom lens is applied to a surveillance camera, the lens is arranged at the farthest back position with respect to the casing at a wide-angle end, in which the angle of view is large. Hence, it is necessary to increase the size of the casing, and that causes a serious problem in structure.

Further, since it is difficult to adopt structure in which an aperture stop is variable because of the cost, the diameter of an entrance pupil is constant through variable magnification. Therefore, F-number at a telephoto end is variable-magnification-ratio times larger than F-number at a wide-angle end, and the specifications are not satisfactory as an optical system for a surveillance camera. Further, since the second group has negative refractive power, an angle of a principal ray with respect to a normal to an image plane becomes large at a wide-angle end, and the telecentricity of the lens, which is an important condition for using an electronic imaging device, becomes lower. Since the two-group zoom lens composed of a positive group and a negative group had many inappropriate features, as described above, it was difficult to adopt such a zoom lens for a surveillance camera.

Therefore, two-group structure composed of a negative group and a positive group, and in which negative refractive power precedes, is desirable as a compact two-group variable magnification optical system for a surveillance camera. As a conventional two-group variable magnification optical system composed of a negative group and a positive group, optical systems disclosed, for example, in Japanese Unexamined Patent Publication No. 2001-330773 (Patent Document 1), Japanese Unexamined Patent Publication No. 2001-281543 (Patent Document 2), Japanese Unexamined Patent Publication No. 2007-079108 (Patent Document 3), Japanese Unexamined Patent Publication No. 2007-279335 (Patent Document 4), and U.S. Patent Application Publication No. 20080174880 (Patent Document 5) are known.

Conventionally, a two-group variable magnification optical system composed of a negative group and a positive group, and in which negative refractive power precedes, has been used as a zoom lens for a single-lens reflex camera, for example, such as Patent Documents 1 and 5, which starts from a wide-angle range. However, an example of arranging, as a first lens, a positive lens on the most object side is rare. That is because if the positive lens is arranged as the first lens, the outer diameter and the center thickness of the lens increase, and the size increases more, and that greatly affects the lens, the weight and the cost. Further, since back focus of an entire system is not secured because of spatial restriction by a mirror box unit, such structure has not been adopted very often except in some zoom lens starting from an ultra wide-angle range, and in a lens in which generation of various off-axial aberrations, such as distortion, needs to be suppressed.

SUMMARY OF THE INVENTION

Since a market for surveillance cameras sharply expanded in recent years, competition in development has become fierce. Meanwhile, a lens system that satisfies various favorable factors, such as a large relative aperture, so that the lens system is usable even in low-illumination photography conditions, and that has high performance, and that is small and structured at low cost, is requested. Further, in recent years, a request for a variable magnification optical system that can image at higher resolution and at a higher magnification ratio so that a license plate of a car is readable in addition to a general surveillance purpose, and that has a relatively medium-telephoto-type variable magnification range in which a focal length at a wide-angle end is slightly longer than that of a conventional one, and is simple and easy to handle has increased.

In view of the foregoing circumstances, it is an object of the present invention to provide a variable magnification optical system that is small and structured at low cost, and in which high optical performance is secured while the optical system has a large relative aperture, and that has a relatively medium-telephoto-type variable magnification range, and an imaging apparatus including the variable magnification optical system.

A first variable magnification optical system of the present invention is a variable magnification optical system consisting of:

a first lens group having negative refractive power;

a stop; and a second lens group having positive refractive power, which are in this order from an object side, wherein a distance between the first lens group and the second lens group in an optical axis direction becomes shorter when magnification is changed from a wide-angle end to a telephoto end, and wherein the stop is fixed relative to an image plane during magnification change, and wherein the first lens group consists of a positive lens having a convex object-side surface and two negative lenses in this order from the object side, and wherein the following formula (1) is satisfied:

$$25.5 < \nu d1 < 50 \qquad (1),$$ where vd1: an Abbe number of the positive lens in the first lens group for d-line.

A second variable magnification optical system of the present invention is a variable magnification optical system consisting of:

a first lens group having negative refractive power;
a stop; and
a second lens group having positive refractive power, which are in this order from an object side, wherein a distance between the first lens group and the second lens group in an optical axis direction becomes shorter when magnification is changed from a wide-angle end to a telephoto end, and wherein the stop is fixed relative to an image plane during magnification change, and wherein the first lens group consists of a positive meniscus lens having a convex object-side surface and two negative lenses in this order from the object side.

In the first and second variable magnification optical systems of the present invention, a target variable magnification range is a medium-telephoto-type range. Therefore, the angle of view at a wide-angle end is a medium-telephoto-type range, which is not so wide. Hence, even if a positive lens is arranged as the first lens, it is not necessary to increase the outer diameter of the positive lens so much. Further, a surveillance camera or the like, to which the variable magnification optical system of the present invention is assumed to be applied, does not require very long back focus. Meanwhile, in a two-group variable magnification optical system composed of a negative group and a positive group, it is necessary to minimize the length of the entire lens, which tends to become long especially on a wide-angle side. Since the positive lens is arranged on the most object side in the first lens group having negative refractive power, it is possible to make the entire system compact, and to secure excellent image formation performance through an entire variable magnification range at the same time.

Further, in the first and second variable magnification optical systems of the present invention, two negative lenses are arranged on the image side of the positive lens in the first lens group, and negative refractive power necessary for the first lens group is secured by distributing the negative refractive power to the two negative lenses. Since the number of lenses in the first lens group is minimized to three, the optical systems are small and low cost.

In the second variable magnification optical system, it is desirable that the following formula (1A) is satisfied:

$$21 < vd1 < 50 \quad (1A), \text{where}$$

vd1: an Abbe number of the positive lens on the most object side in the first lens group for d-line.

In the first and second variable magnification optical systems of the present invention, it is desirable that the following formula (2) is satisfied:

$$0.8 < f1/fw < 2.5 \quad (2), \text{where}$$

f1: a focal length of the positive lens on the most object side in the first lens group, and fw: a focal length of the entire system at a wide-angle end.

Further, in the first and second variable magnification optical system of the present invention, the second lens group may adopt five-lens structure consisting of a double-convex lens, a negative meniscus lens, a double-convex lens, a double-concave lens and a positive lens, which are in this order from the object side.

In the first and second variable magnification optical systems of the present invention, when the second lens group adopts the aforementioned five-lens structure, it is desirable that the following formula (3) or the following formulas (4) through (6) are satisfied:

$$0.5 < f4/fG2 < 1.3 \quad (3);$$

$$-0.6 < fG2F/fG2B < -0.2 \quad (4);$$

$$0 < vd7 - vd8 < 25 \quad (5); \text{and}$$

$$15 < vd8 < 33 \quad (6), \text{where}$$

f4: a focal length of the double-convex lens on the most object side in the second lens group, fG2: a focal length of the second lens group, fG2F: a combined focal length of three object-side lenses in the second lens group, fG2B: a combined focal length of two image-side lenses in the second lens group, vd7: an Abbe number of the double-concave lens in the second lens group for d-line, and vd8: an Abbe number of the positive lens in the second lens group for d-line.

Here, the term "three object-side lenses" about fG2F refers to first through third lenses from the object side, and the term "two image-side lenses" about fG2B refers to first and second lenses from the image side. When the third lens and the fourth lens from the object side are cemented together, the cemented lens is divided into single lenses for fG2F and fG2B.

Further, in the first and second variable magnification optical systems of the present invention, it is desirable that the second lens group includes at least one cemented surface satisfying the following formula (7):

$$-0.75 < Rc/fw < 0.70 \quad (7), \text{where}$$

Rc: the curvature radius of a cemented surface, and fw: a focal length of the entire system at a wide-angle end.

The sign of a curvature radius is positive when the shape of a surface is convex toward the object side, and negative when the shape of a surface is convex toward the image side.

In the first and second variable magnification optical systems of the present invention, it is desirable that the following formula (8) or the following formulas (9) and (10) are satisfied:

$$1.2 < H1/H6 < 1.5 \quad (8);$$

$$1.4 < dw/fw < 2.2 \quad (9); \text{and}$$

$$4.5 < Lw/fw < 5.6 \quad (10), \text{where}$$

H1: the height of a marginal ray of axial rays on a most-object-side surface in the first lens group at a wide-angle end, H6: the height of a marginal ray of the axial rays on a most-image-side surface in the first lens group at a wide-angle end, dw: a distance on an optical axis between the first lens group and the second lens group at a wide-angle end, fw: a focal length of the entire system at a wide-angle end, and Lw: an entire lens length at a wide-angle end (a distance on the optical axis from the most-object-side surface in the first lens group to an image plane).

Here, the term "axial rays" refers to rays from an object at infinity on an optical axis entering at a maximum diameter based on predetermined specifications, such as F-number and an aperture stop.

In calculation of Lw, a length in air is used, as a back focal portion of the lens system. For example, when a member without refractive power, such as a filter and a cover glass, is inserted between the most-image-side lens and an image plane, Lw is calculated by using a length in air, as the thickness of the member.

In the variable magnification optical system of the present invention, when a lens includes an aspherical surface, the shape of a surface of the lens and the sign of the refractive power of the lens is considered in a paraxial region.

An imaging apparatus of the present invention includes the variable magnification optical system of the present invention, and an imaging device that images an optical image formed by the variable magnification optical system, and outputs the optical image as electrical signals.

According to the first variable magnification optical system of the present invention, a negative first lens group, a stop and a positive second lens group are arranged in this order from an object side. Further, a distance between the first lens group and the second lens group in an optical axis direction becomes shorter when magnification is changed from a wide-angle end to a telephoto end. Further, the stop is fixed relative to an image plane during magnification change, and the structure of the first lens group is appropriately set. Especially, a positive lens is arranged on the most object side in the first lens group, and the material of the positive lens is selected to satisfy formula (1). Therefore, it is possible to realize a variable magnification optical system that is small and structured at low cost, and in which high optical performance is secured while the optical system has a large relative aperture, and that has a relatively medium-telephoto-type variable magnification range.

According to the second variable magnification optical system of the present invention, a negative first lens group, a stop and a positive second lens group are arranged in this order from an object side. Further, a distance between the first lens group and the second lens group in an optical axis direction becomes shorter when magnification is changed from a wide-angle end to a telephoto end. Further, the stop is fixed relative to an image plane during magnification change, and the structure of the first lens group is appropriately set. Especially, a positive meniscus lens having a convex object-side surface is arranged on the most object side in the first lens group. Therefore, it is possible to realize a variable magnification optical system that is small and structured at low cost, and in which high optical performance is secured while the optical system has a large relative aperture, and that has a relatively medium-telephoto-type variable magnification range.

Further, the imaging apparatus of the present invention includes the variable magnification optical system of the present invention. Therefore, the imaging apparatus is small and structurable at low cost, and photography is possible even in low-illumination conditions, and excellent images are obtainable at a higher magnification ratio.

BRIEF DESCRIPTION OF THE DRAWINGS

FIG. 2, Sections A through C are cross sections illustrating the lens structure of a variable magnification optical system in Example 1 of the present invention at a wide-angle end, in a middle focal length state, and at a telephoto end, respectively;

FIG. 11, Sections A through C are cross sections illustrating the lens structure of a variable magnification optical system in Example 10 of the present invention at a wide-angle end, in a middle focal length state, and at a telephoto end, respectively;

FIG. 12, Sections A through I are aberration diagrams of the variable magnification optical system in Example 1 of the present invention;

FIG. 13, Sections A through I are aberration diagrams of the variable magnification optical system in Example 2 of the present invention;

FIG. 14, Sections A through I are aberration diagrams of the variable magnification optical system in Example 3 of the present invention;

FIG. 15, Sections A through I are aberration diagrams of the variable magnification optical system in Example 4 of the present invention;

FIG. 16, Sections A through I are aberration diagrams of the variable magnification optical system in Example 5 of the present invention;

FIG. 17, Sections A through I are aberration diagrams of the variable magnification optical system in Example 6 of the present invention;

FIG. 18, Sections A through I are aberration diagrams of the variable magnification optical system in Example 7 of the present invention;

FIG. 19, Sections A through I are aberration diagrams of the variable magnification optical system in Example 8 of the present invention;

FIG. 20, Sections A through I are aberration diagrams of the variable magnification optical system in Example 9 of the present invention;

FIG. 21, Sections A through I are aberration diagrams of the variable magnification optical system in Example 10 of the present invention.

DESCRIPTION OF THE PREFERRED EMBODIMENTS

Figure 1:
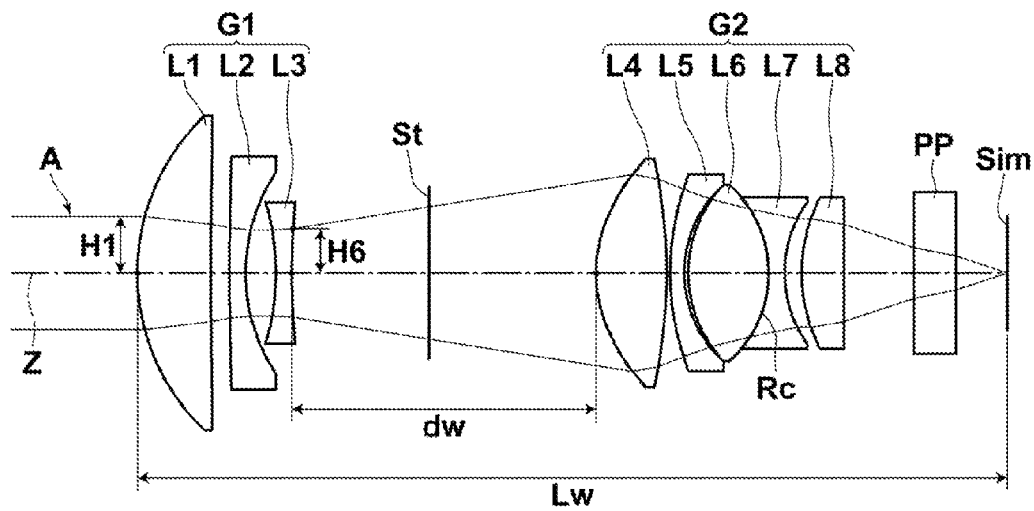
FIG. 1 is a cross section illustrating the lens structure of a variable magnification optical system according to an embodiment of the present invention and axial rays.

Hereinafter, embodiments of the present invention will be described in detail with reference to drawings. FIG. 1 is a cross section illustrating a structure example of a variable magnification optical system according to an embodiment of the present invention at a wide-angle end when the optical system is focused on an object at infinity. The example illustrated in FIG. 1 corresponds to a variable magnification optical system in Example 1, which will be described later. In FIG. 1, the left side is the object side, and the right side is the image side. In FIG. 1, axial rays A are also illustrated.

The variable magnification optical system consists of first lens group G1 having negative refractive power, aperture stop St and second lens group G2 having positive refractive power, which are in this order along optical axis Z from an object side. A distance between first lens group G1 and second lens group G2 in an optical axis direction becomes shorter when magnification is changed from a wide-angle end to a telephoto end. Aperture stop St is fixed relative to image plane Sim during magnification change. Aperture stop St illustrated in FIG. 1 does not necessarily represent the size nor the shape of the aperture stop St, but the position of the aperture stop St on optical axis Z.

When the variable magnification optical system is applied to an imaging apparatus, it is desirable to arrange a cover glass, a prism, and various filters, such as an infrared ray cut filter and a low-pass filter, between the optical system and image plane Sim based on the structure of the camera side on which the lens is mounted. Therefore, FIG. 1 illustrates an example in which parallel-flat-plate-shaped optical member PP, which is assumed to be such elements, is arranged between second lens group G2 and image plane Sim.

As illustrated in FIG. 1, first lens group G1 consists of lens L1 that is a positive lens having a convex object-side surface, lens L2 that is a negative lens and lens L3 that is a negative lens in this order from the object side. All of the lenses in first lens group G1 may be single lenses, and that is cost-advantageous.

For example, as illustrated in FIG. 1, second lens group G2 may consist of lens L4 that is a double-convex lens, lens L5 that is a negative meniscus lens, lens L6 that is a double-convex lens, lens L7 that is a double-concave lens and lens L8 that is a positive lens, which are in this order from the object side.

The variable magnification optical system of the present embodiment has two-group structure composed of a negative group and a positive group. Negative first lens group G1 and positive second lens group G2 are arranged in this order from the object side. In negative first lens group G1, a positive lens is arrange on the most object side. Therefore, the arrangement is positive and negative from the object side. In positive second lens group G2, a front-side sub-lens-group consisting of lenses L4 through L6, and which has strong positive refractive power, is arranged on the object side. Further, a rear-side sub-lens-group consisting of lenses L7 and L8, and which has negative refractive power, is arranged on the image side. Therefore, the structure is a telephoto lens type in which positive refractive power is arranged on the object side and negative refractive power is arranged on the image side. Since such structure is adopted, it is possible to shorten the lens length of the lens system.

Aperture stop St is independent of first lens group G1 and second lens group G2, and fixed relative to an image plane during magnification change. Aperture stop St is arranged between first lens group G1 and second lens group G2. As in the example illustrated in FIG. 1, when positive lenses (corresponding to lens L1 and lens L8) are arranged on the most outer sides in the entire system with respect to aperture stop St, as a center, and negative lenses (corresponding to lens L2 and lens L7) are arranged immediately on the inner sides of the positive lenses, it is possible to make the absolute value of a Petzval sum of the entire system small, and to suppress various off-axial aberrations caused by asymmetry by giving symmetry with respect to aperture stop St. Therefore, it is possible to maintain excellent image formation performance in an entire image formation region through an entire variable magnification range.

In the variable magnification optical system of the present embodiment, positive lens L1 is arranged on the most object side in first lens group G1. In the two-group variable magnification optical system composed of a negative group and a positive group having a medium-telephoto-type variable magnification range, and in which the focal length at a wide-angle end is slightly longer, the positive lens is arranged on the most object side in first lens group G1, which has negative refractive power. Therefore, it is possible to make the entire system compact and to secure excellent image formation performance through the entire variable magnification range at the same time.

The shape of Lens L1 is convex toward an object side. In that case, it is desirable that the absolute value of the curvature radius of the object-side surface is less than the absolute value of the curvature radius of the image-side surface. In such a case, it is possible to more easily suppress the entire lens length and the lens diameter so that they are small in the two-group variable magnification optical system composed of a negative group and a positive group, and which has the aforementioned variable magnification range.

In the variable magnification optical system of the present embodiment, the structure of lens L1 is important. It is desirable that the material of lens L1 is selected in such a manner that the following formula (1) is satisfied:

$$25.5 < vd1 < 50 \qquad (1),\text{where}$$

vd1: an Abbe number of positive lens L1 in first lens group G1 for d-line.

Formula (1) defines the range of the Abbe number of positive lens L1 to excellently maintain chromatic aberrations. When the value is lower than the lower limit of formula (1), a secondary spectrum becomes worse, and blue-side flare increases, and the image quality deteriorates. When the value exceeds the upper limit of formula (1), it is possible to reduce such a secondary spectrum. However, the refractive power of the positive lens and the refractive power of the negative lenses in first lens group G1 become strong with respect to each other for achromatization, and they must be cemented together to pass off-axial rays. That causes an increase in cost, and sharp generation of a coma aberration and curvature of field. Therefore, performance deteriorates.

Therefore, it is more desirable that the following formula (1-1) is satisfied instead of formula (1):

$$29 < vd1 < 40 \qquad (1\text{-}1).$$

Further, with respect to lens L1, it is desirable that the following formula (2) is satisfied:

$$0.8 < f1/fw < 2.5 \qquad (2),\text{where}$$

f1: a focal length of positive lens L1 in first lens group G1, and fw: a focal length of the entire system at a wide-angle end.

Lens L1 has a function of reducing an excessively corrected spherical aberration caused by dispersion characteristics of the negative refractive power of whole first lens group G1, and the like. Therefore, it is necessary to carefully consider allocation of positive refractive power to lens L1, and that is defined by formula (2). When the value is lower than the lower limit of formula (2), positive refractive power of lens L1 becomes too strong. Therefore, it becomes difficult to pass off-axial rays on a wide-angle side unless lens L1 is cemented with the following negative lens on the image side of lens L1. A focal length at a wide-angle end becomes long, and it becomes impossible to maintain an expected angle of view. Further, even if the lenses are cemented together, a spherical aberration and off-axial aberrations become unbalanced, and excellent image formation performance is not obtainable.

When the value exceeds the upper limit of formula (2), a back focus becomes too long on the contrary, and the entire lens length of the entire system becomes too long, and that contradicts reduction in size. When the value exceeds the upper limit of formula (2), the positive refractive power in first lens group G1 becomes too weak, and a spherical aberration is generated excessively in first lens group G1. Therefore, it becomes impossible to suppress a spherical aberration both on a wide-angle side and on a telephoto side so that the spherical aberration is small. In that case, if the spherical aberration is corrected by increasing a distance between lens L1 and the following negative lens on the image side of lens L1, the outer diameter of lens L1 becomes too large, and that prevents the system from becoming compact.

Therefore, it is more desirable that the following formula (2-1) is satisfied instead of formula (2):

$$1.0 < f1/fw < 2.0 \quad (2\text{-}1).$$

Here, as a method for achieving the object of the present invention without making the positive refractive power of lens L1 very strong, a method of adopting a positive meniscus lens having a convex object-side surface, as lens L1, is effective. When lens L1 is a positive meniscus lens, it is possible to increase the angle of refraction of axial rays by reducing the absolute value of the curvature radius of the object-side surface of lens L1 than the case of adopting a double-convex lens as lens L1. Therefore, it is possible to make the height of rays on the image-side surface of lens L1, which exit from lens L1, low. Hence, a similar effect to an effect of increasing the refractive power of lens L1 is obtainable. Further, the positive refractive power of lens L1 becomes weaker because of the concave image-side surface of lens L1, compared with a case in which lens L1 is a double-convex lens or a plano-convex lens. Therefore, it is possible to make the entire length short without making the refractive power of lens L1 strong. Further, when lens L1 is a positive meniscus lens, it is possible to make a difference between an angle of incidence and an angle of exit in lens L1 small also for axial rays. Therefore, it is possible to suppress generation of off-axial aberrations.

Here, it is necessary to consider the range of the Abbe number of the material of lens L1 to suppress generation of chromatic aberrations. When lens L1 is a positive meniscus lens, the refractive power of lens L1 is relatively weak. Therefore, a wider range may be considered as the appropriate range of the Abbe number of the material, compared with a case in which the shape of lens L1 is not limited to a meniscus shape. Hence, when lens L1 is a positive meniscus lens, it is desirable that the following formula (1A) is satisfied:

$$21 < vd1 < 50 \quad (1\text{A}), \text{ where}$$

vd1: an Abbe number of positive lens L1 in first lens group G1 for d-line.

When the value is lower than the lower limit of formula (1A), Abbe number vd1 is smaller than necessary. It is possible to make the refractive power of each of a positive lens and negative lenses used for achromatization in first lens group G1 weak, and that is advantageous to correction of a spherical aberration and curvature of field. However, a secondary spectrum of chromatic aberrations becomes worse, and it becomes impossible to suppress generation of a color fringe.

When the value exceeds the upper limit of formula (1A), the refractive power of each of the positive lens and the negative lenses used in achromatization in first lens group G1 becomes strong. A secondary spectrum decreases, and it is possible to correct a color fringe in an excellent manner. However, the aberration generation amount of a spherical aberration and curvature of field becomes large, and image formation performance becomes uneven depending on whether it is axial or off-axial, or whether it is at a wide-angle end or at a telephoto end. Therefore, it becomes impossible to maintain an excellent image formation relationship through the entire variable magnification range.

Therefore, it is more desirable that the following formula (1A-1) is satisfied instead of formula (1A):

$$22 < vd1 < 50 \quad (1\text{A-}1).$$

As a desirable combination of the shape of lens L1 and an Abbe number, there are a case in which lens L1 is a positive lens having a convex object-side surface and satisfies formula (1), and a case in which lens L1 is a positive meniscus lens having a convex object-side surface and satisfies formula (1A), as described above. The structure of Lens L1 may be other than the two kinds of desirable structure. For example, lens L1 may be designed as a double-convex lens having an Abbe number of 25.4 for d-line. However, in such a case, there is a risk of generation of defects, such as a color fringe.

It is desirable that at least one of two negative lenses L2 and L3 in first lens group G1 is a double-concave lens. Since first lens group G1 has negative refractive power, axial rays exit from first lens group G1 in such a manner to be away from optical axis Z, and off-axial rays exit toward aperture stop St on the image side of first lens group G1 in such a manner to be closer to optical axis Z. When negative lens L3 on the most image side in first lens group G1 is a double-concave lens, a difference between the direction of the angle of exit of axial rays and that of off-axial rays is reduced. Further, it is possible to reduce also a difference between the angle of incidence and the angle of exit for both of the rays. Therefore, it is possible to suppress the amount of generated aberrations.

If the shape of lens L3 is changed to a meniscus shape while the negative refractive power of lens L3 is maintained, a difference between an angle of incidence and an angle of exit of axial rays or off-axial rays increases because of the difference in the angles of exit. Therefore, excessive aberrations are generated, and recovery becomes impossible even by the convergence action of second lens group G2. Further, it becomes impossible to maintain excellent image formation performance at the center and in the periphery of an image formation region. Therefore, it becomes necessary to weaken the negative refractive power of lens L3. However, in such a case, it becomes necessary to distribute the negative refractive power to another composition element in first lens group G1. Hence, it is desirable that lens L2 is a double concave lens.

When second lens group G2 adopts five-lens structure consisting of double-convex lens L4, negative meniscus lens L5, double-convex lens L6, double-concave lens L7 and positive lens L8, which are arranged in this order from the object side, it is desirable that the following formula (3) or the following formulas (4) through (6) are satisfied. When second lens group G2 is structured in this manner, it is possible to prevent a further increase in the size of a two-group variable magnification system, in which the entire lens length tends to be long because of the structure of the lens, in specifications of a medium-telephoto-type range. It is possible to achieve excellent image formation performance in an entire image formation region through an entire range of a wide-angle end through a telephoto end, and to reduce size:

$$0.5 < f4/fG2 < 1.3 \quad (3);$$

$$-0.6 < fG2F/fG2B < -0.2 \quad (4);$$

$$0 < vd7 - vd8 < 25 \quad (5); \text{ and}$$

$$15 < vd8 < 33 \quad (6), \text{where}$$

f4: a focal length of lens L4 in second lens group G2,
fG2: a focal length of second lens group G2,
fG2F: a combined focal length of three object-side lenses in second lens group G2,
fG2B: a combined focal length of two image-side lenses in second lens group G2,
vd7: an Abbe number of lens L7 in second lens group G2 for d-line, and
vd8: an Abbe number of lens L8 in second lens group G2 for d-line.

Formula (3) is related to the ratio of the refractive power of positive lens L4 that is arranged on the most object side in second lens group G2 to the refractive power of second lens group G2. As illustrated in FIG. 1, the height of a marginal ray of axial rays is highest at lens L4 in the entire system. Therefore, an influence of lens L4 on specifications and performance is strong.

When the value is lower than the lower limit of formula (3), the refractive power of lens L4 is too strong, and a back focus of the entire system becomes short, and a space for arranging a filter or the like between the lens system and image plane Sim becomes insufficient. Therefore, it becomes difficult to mount the optical system on an imaging apparatus. If the excess of the strong refractive power of lens L4 is tried to be compensated by the following lens on the image side of lens L4, generation of off-axial aberrations, such as an off-axial coma aberration and curvature of field, increases. Therefore, it becomes impossible to maintain excellent image formation performance in the entire image formation region.

When the value exceeds the upper limit of formula (3), the refractive power of lens L4 becomes weak. Therefore, it becomes necessary to increase the refractive power of positive lens L6. Therefore, it becomes difficult to excellently correct a longitudinal chromatic aberration including a secondary spectrum in the entire system and a spherical aberration at the same time.

Formula (4) defines a relationship between combined focal length f2GF of a front-side sub-lens-group in second lens group G2 and combined focal length f2 GB of a rear-side sub-lens-group in second lens group G2. The front-side sub-lens-group consists of lenses L4 through L6 on the object side in second lens group G2, and the rear-side sub-lens-group consists of lenses L7 and L8 on the image side in second lens group G2. As described already, second lens group G2 in the variable magnification optical system of the present embodiment adopts telephoto-lens-type distribution of positive refractive power and negative refractive power for the front-side sub-lens-group and the rear-side sub-lens-group to reduce the entire length of the lens system. The distribution of refractive power has an influence on the entire system.

When the value is lower than the lower limit of formula (4), the positive refractive power of the front-side sub-lens-group becomes too weak, and a back focus of the entire system becomes long, and the entire lens length becomes long. Therefore, the compactness is damaged. Further, curvature of field is excessively corrected, and that results in deterioration of performance in an off-axial peripheral region, which is not desirable.

When the value exceeds the upper limit of formula (4), the positive refractive power of the front-side sub-lens-group becomes strong, and second lens group G2 becomes more telephoto. A back focus especially at a wide-angle end becomes too short in the entire system, and it becomes difficult to mount the optical system on an imaging apparatus. When the value exceeds the upper limit of formula (4), the negative refractive power of the rear-side sub-lens-group becomes too weak, and correction of curvature of field becomes insufficient. Therefore, off-axial performance deteriorates.

Formulas (5) and (6) should be satisfied to excellently maintain chromatic aberrations, especially, a lateral chromatic aberration while formula (4) is satisfied. Formula (5) is related to the material of lenses L7 and L8 constituting the rear-side sub-lens-group in second lens group G2. When the Abbe number of negative lens L7 is made closer to the Abbe number of positive lens L8 to correct chromatic aberrations, the negative refractive power of lens L7 becomes strong, compared with the positive refractive power of lens L8. Therefore, the negative refractive power of the rear-side sub-lens-group in second lens group G2 becomes strong, and the value becomes close to the upper limit of formula (4). When the Abbe number of lens L7 is changed in such a manner that a difference from the Abbe number of lens L8 increases, the negative refractive power of lens L7 becomes weak, and the value becomes close to the lower limit of formula (4). In other words, when the range defined by formula (5) is not satisfied, formula (4) is not satisfied. Therefore, the aforementioned problems that arise when formula (4) is not satisfied occur.

Similarly, with respect to formula (6), chromatic aberrations may be corrected even if the range defined by formula (6) is not satisfied. However, when the range defined by formula (6) is not satisfied, formula (4) is not satisfied, and similar problems occur. Further, if chromatic aberrations are corrected while formula (4) is satisfied, it is necessary that Abbe number vd8 of positive lens L8 is in the range defined by formula (6). If Abbe number vd8 of positive lens L8 is outside the range defined by formula (6), one of a problem that correction of chromatic aberrations becomes difficult, a problem that image formation performance deteriorates, and a problem that the compactness is damaged occurs.

Therefore, it is more desirable that the following formula (6-1) is satisfied instead of formula (6):

$$20 < vd8 < 30 \quad (6\text{-}1).$$

All of the lenses constituting second lens group G2 may be single lenses, but second lens group G2 may include at least one cemented lens. As a cemented lens, a cemented lens of lens L4 and lens L5, a cemented lens of lens L5 and lens L6, or a cemented lens of lens L6 and lens L7 may be adopted.

In the variable magnification optical system of the present embodiment, it is desirable that second lens group G2 includes at least one cemented surface satisfying the following formula (7):

$$-0.75 < Rc/fw < 0.70 \quad (7), \text{where}$$

Rc: the curvature radius of a cemented surface, and
fw: a focal length of the entire system at a wide-angle end.

Use of anomalous dispersion material is essential to make chromatic aberrations, especially a longitudinal chromatic aberration including a secondary spectrum, excellent. However, in a pair of lenses used for achromatization, it is necessary to make the refractive power of one of the pair of lenses and the refractive power of the other one of the pair of lenses strong with respect to each other to reduce a secondary spectrum further. At this time, if air is present between the one of the pair of lenses and the other one of the pair of lenses, the curvature of surfaces facing each other becomes large, and a high-order spherical aberration is generated, and image formation performance deteriorates, and that is not desirable. Therefore, if the surfaces having large curvature, and which face each other, are cemented together, the aforementioned problem does not arise, and excellent image formation performance is obtained.

When second lens group G2 consists of a double-convex lens, a negative meniscus lens, a double-convex lens, a double-concave lens and a positive lens, which are in this order from the object side, and a cemented surface having a large curvature satisfying formula (7) is provided in second lens group G2, it is possible to reduce chromatic aberrations including a secondary spectrum, and to realize a small variable magnification optical system having excellent image formation performance. Further, the feature of cementing can reduce deterioration of performance caused by a production error in a surface distance. Further, the assembly characteristics are improved.

Formula (7) is a relational expression representing a relationship between curvature radius Rc and focal length fw of the entire system when the curvature radius of the cemented surface in second lens group G2 is Rc. When the value is outside the range defined by formula (7), it becomes difficult to sufficiently correct chromatic aberrations including a secondary spectrum.

In the variable magnification optical system of the present embodiment, it is desirable that the following formula (8) is satisfied:

$$1.2 < H1/H6 < 1.5 \quad (8),$$

where

H1: the height of a marginal ray of axial rays on a most-object-side surface in first lens group G1 at a wide-angle end, and H6: the height of the marginal ray of axial rays on a most-image-side surface in first lens group G1 at a wide-angle end.

Formula (8) may be regarded as a formula representing the effect of arranging positive lens L1 on the object side in first lens group G1. A characteristic feature of the variable magnification optical system of the present embodiment is that a positive lens having a convex object-side surface is arranged on the most object side in first lens group G1. As described already, this feature is adopted to make the entire lens length and the lens diameter small in a two-group variable magnification optical system of a negative group and a positive group that has a medium-telephoto-type variable magnification range. Formula (8) evidences the effect.

Specifically, formula (8) defines an appropriate range of H1/H6 with respect to axial rays from an object at infinity at a wide-angle end with maximum aperture when the height of a marginal ray entering an object-side surface of lens L1 is H1, and the height of the marginal ray exiting from an image-side surface of lens L3 is H6.

When the value is lower than the lower limit of formula (8), it is impossible to reduce the diameter of the aperture of a stop at a wide-angle end. Further, a back focus is not very short. Therefore, the entire lens length does not become short, and the compactness of the variable magnification optical system is insufficient. When the value exceeds the upper limit of formula (8), reduction in the size of the lens system is more expectable. However, the refractive power of lens L1 is too strong, and off-axial rays on a wide-angle side do not pass sufficiently. Therefore, a problem that an expected angle of view is not obtainable, a problem that image formation performance in a peripheral region deteriorates, and the like occur.

In the variable magnification optical system of the present embodiment, it is desirable that the following formulas (9) and (10) are satisfied:

$$1.4 < dw/fw < 2.2 \quad (9); \text{ and}$$

$$4.5 < Lw/fw < 5.6 \quad (10),$$

where dw: a distance on an optical axis between first lens group G1 and second lens group G2 at a wide-angle end, fw: a focal length of the entire system at a wide-angle end, and Lw: an entire lens length at a wide-angle end.

Formula (9) is related to a range of necessary distance dw between first lens group G1 and second lens group G2 in the variable magnification optical system of the present embodiment at a wide-angle end. In the variable magnification optical system of the present embodiment, aperture stop St is fixed relative to image plane Sim. The value of dw is obtained by adding a necessary space around an aperture stop mechanism to the movement amount of first lens group G1 and the movement amount of second lens group G2 for realizing a variable magnification ratio assumed in the variable magnification optical system of the present embodiment, e.g., a variable magnification ratio of about 2.4 times. Formula (9) defines a range of an appropriate ratio of dw to fw.

When the value is lower than the lower limit of formula (9), it is necessary to further reduce the movement amounts of the first lens group G1 and the second lens group G2. Further, it is necessary to increase the negative refractive power of first lens group G1 and the positive refractive power of second lens group G2. Therefore, it becomes impossible to maintain excellent image formation performance. When the value exceeds the upper limit of formula (9), a distance between first lens group G1 and second lens group G2 becomes long, and the size of the entire system becomes too large, and that contradicts reduction in size.

Formula (10) defines a range of an appropriate ratio of entire lens length Lw (a distance from the most-object-side surface in the entire system to image plane Sim on an optical axis) to focal length fw at a wide-angle end. When the value is lower than the lower limit of formula (10), it is possible to further reduce the size of the lens system. However, it becomes necessary to increase the negative refractive power of first lens group G1 and the positive refractive power of second lens group G2, or to reduce the variable magnification ratio. Therefore, it becomes impossible to maintain excellent image formation performance, or to achieve expected specifications. The value is lower than the lower limit of formula (10) also when the positive refractive power of lens L1 in first lens group G1 becomes stronger. In this case, a back focus at a wide-angle end becomes insufficient, and it becomes impossible to apply the optical system to an imaging apparatus.

When the value exceeds the upper limit of formula (10), a focal length at a wide-angle end becomes shorter, and the outer diameter of lenses in first lens group G1 becomes large. Therefore, it becomes difficult to reduce size. Further, the movement amount of first lens group G1 and second lens group G2 during magnification change becomes large. Further, the diameter of the lens system increases, and the compactness is damaged, and that is not desirable.

When the variable magnification optical system of the present embodiment is used in tough conditions, it is desirable that a multi-layer coating for protection is applied. Besides the coating for protection, an anti-reflection coating for reducing ghost light or the like during usage may be applied.

In the example illustrated in FIG. 1, optical member PP is arranged between the lens system and image plane Sim. Instead of arranging various filters, such as a low-pass filter and a filter that cuts a specific wavelength band, or the like, the various filters may be arranged between lenses. Alternatively, a coating having similar action to that of various filters may be applied to a lens surface of one of the lenses.

Next, numerical value examples of the variable magnification optical system of the present invention will be described. FIG. 2, Sections A through C illustrate arrangement of lenses of the variable magnification optical system in Example 1 at a wide-angle end, in a middle focal length state, a telephoto end, respectively. In FIG. 2, Sections A through C, optical member PP is also illustrated, and the left side is the object side, and the right side is the image side. The illustrated aperture stop St does not necessarily represent the size nor the shape of the aperture stop St, but represents the position of the aperture stop St on optical axis Z. Further, arrows between FIG. 2, Section A and FIG. 2, Section B and arrows between FIG. 2, Section B and FIG. 2, Section C schematically indicate movement paths of groups that move as magnification is changed.

Figure 3:
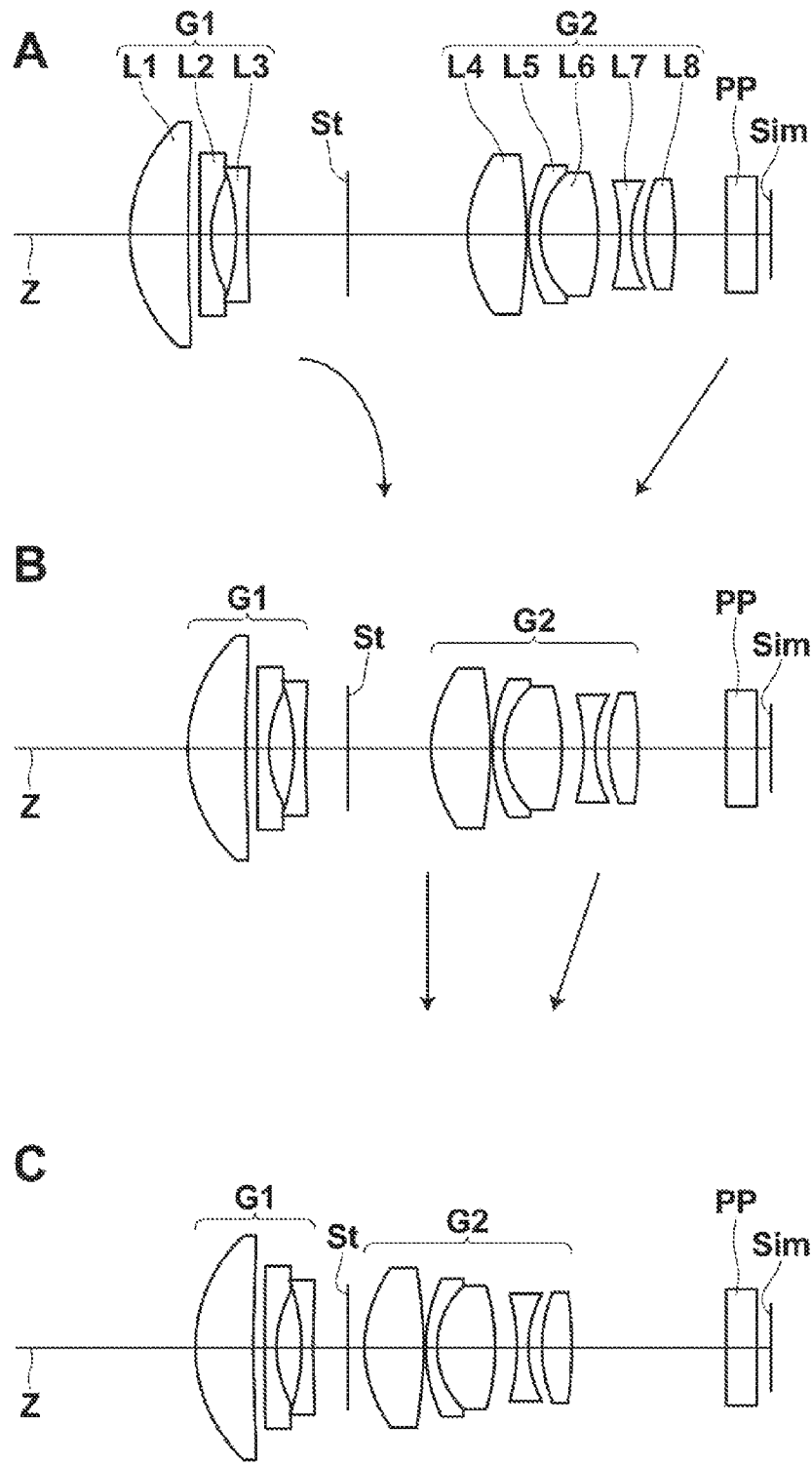
FIG. 3, Sections A through C are cross sections illustrating the lens structure of a variable magnification optical system in Example 2 of the present invention at a wide-angle end, in a middle focal length state, and at a telephoto end, respectively.
Figure 4:
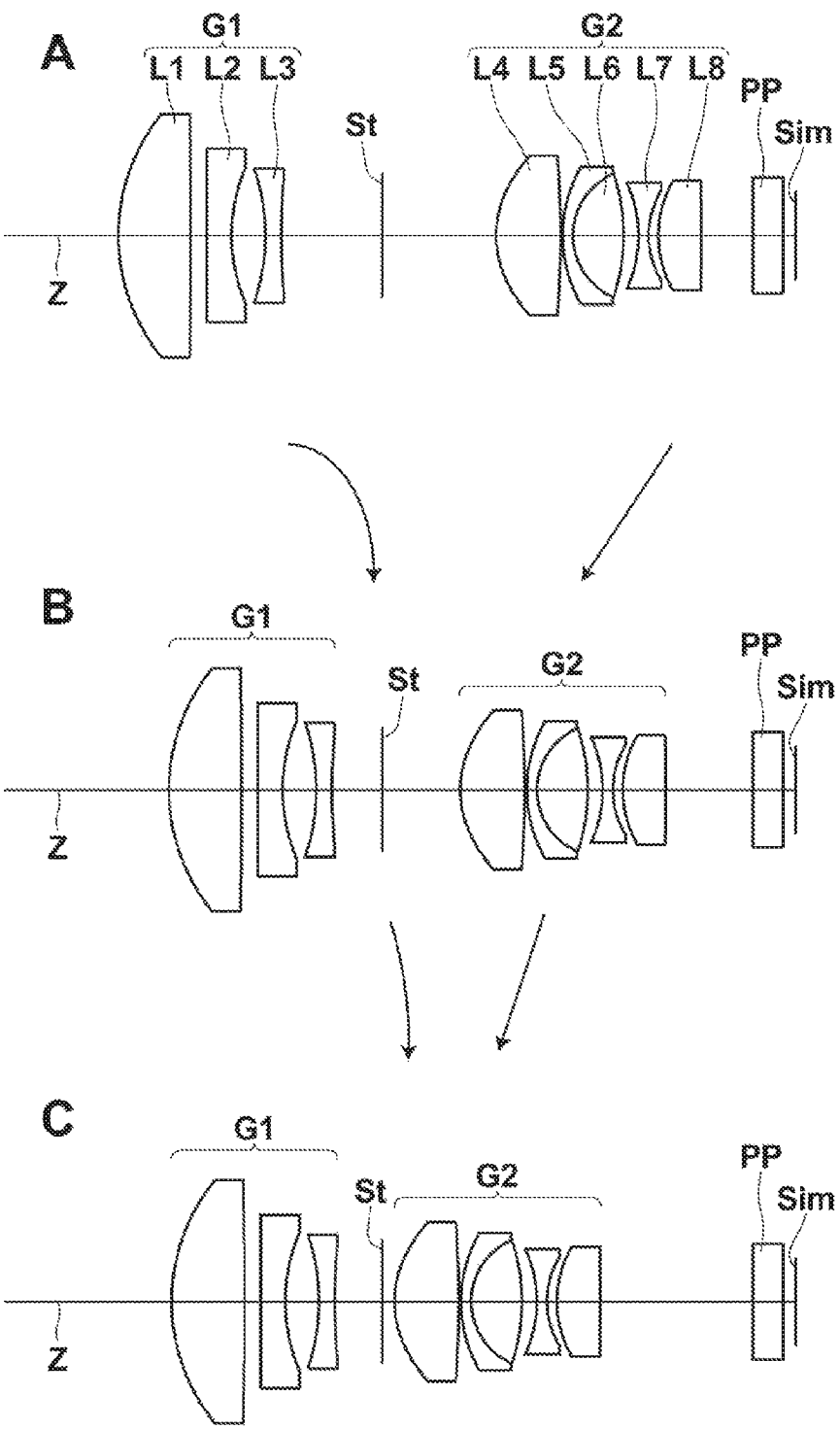
FIG. 4, Sections A through C are cross sections illustrating the lens structure of a variable magnification optical system in Example 3 of the present invention at a wide-angle end, in a middle focal length state, and at a telephoto end, respectively.
Figure 5:
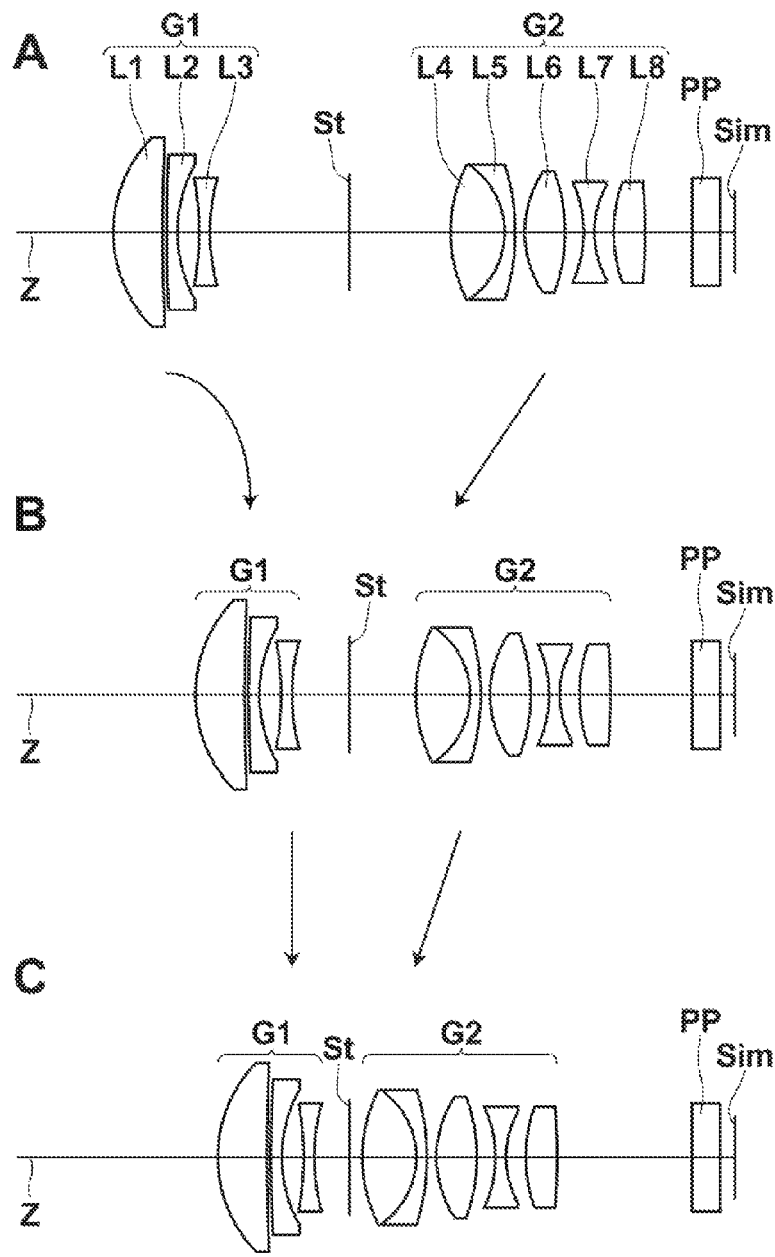
FIG. 5, Sections A through C are cross sections illustrating the lens structure of a variable magnification optical system in Example 4 of the present invention at a wide-angle end, in a middle focal length state, and at a telephoto end, respectively.
Figure 6:
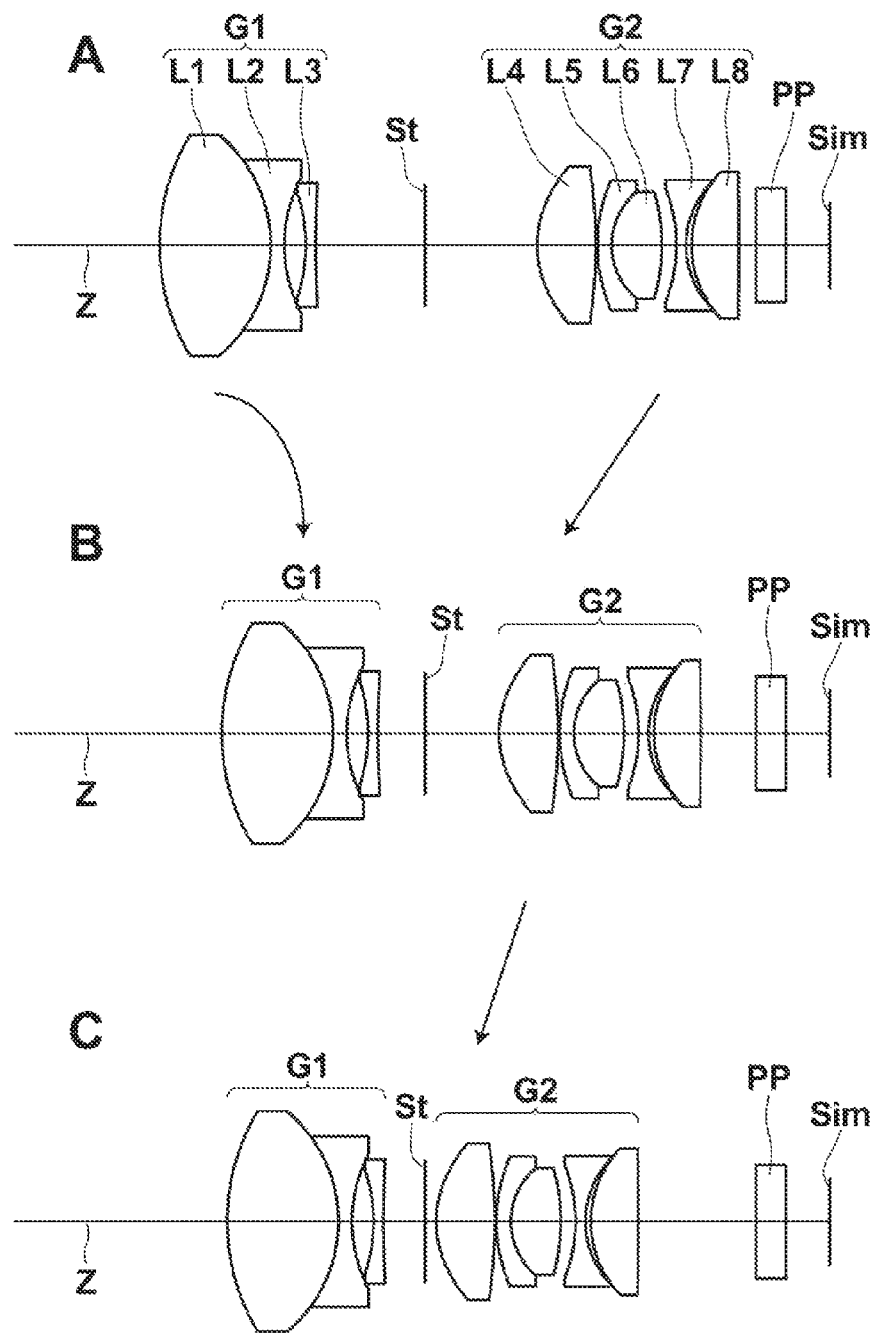
FIG. 6, Sections A through C are cross sections illustrating the lens structure of a variable magnification optical system in Example 5 of the present invention at a wide-angle end, in a middle focal length state, and at a telephoto end, respectively.
Figure 7:
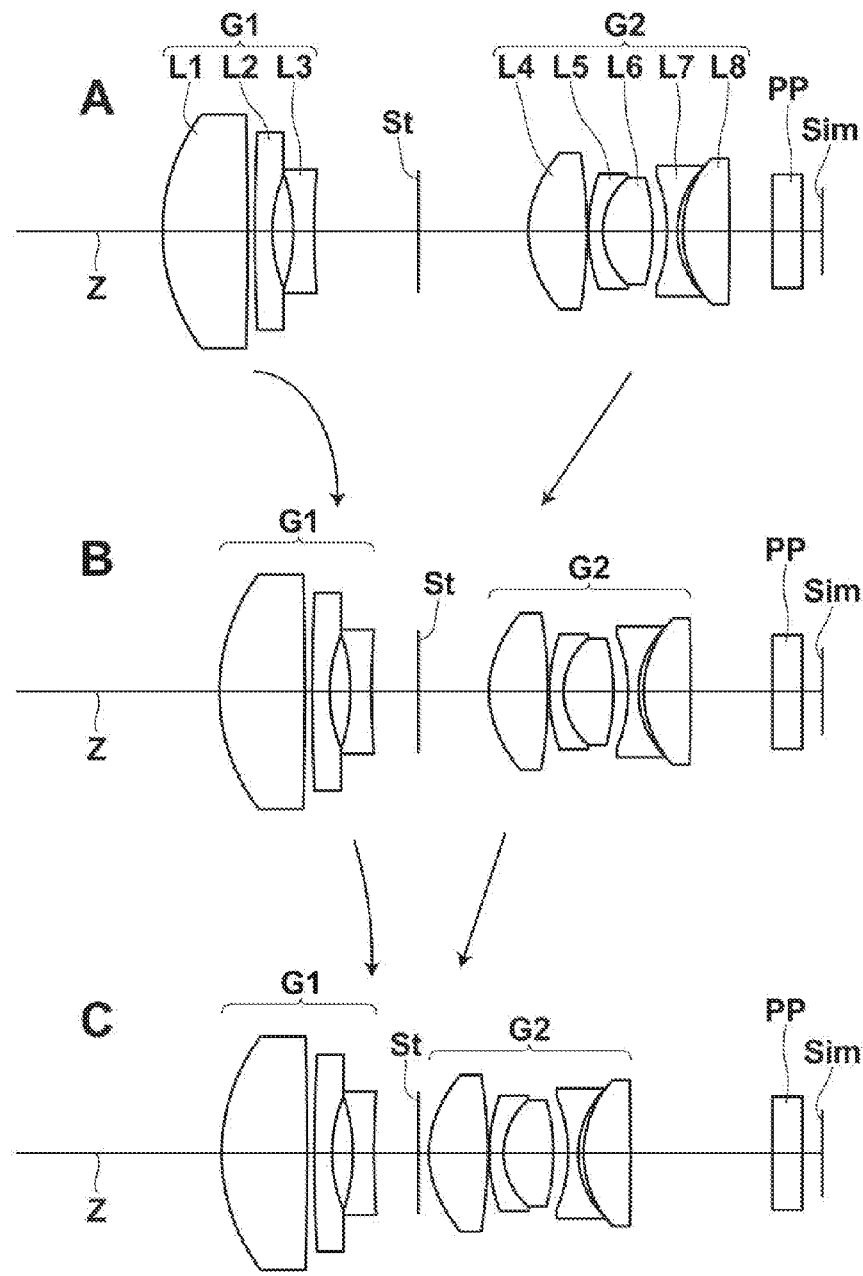
FIG. 7, Sections A through C are cross sections illustrating the lens structure of a variable magnification optical system in Example 6 of the present invention at a wide-angle end, in a middle focal length state, and at a telephoto end, respectively.
Figure 8:
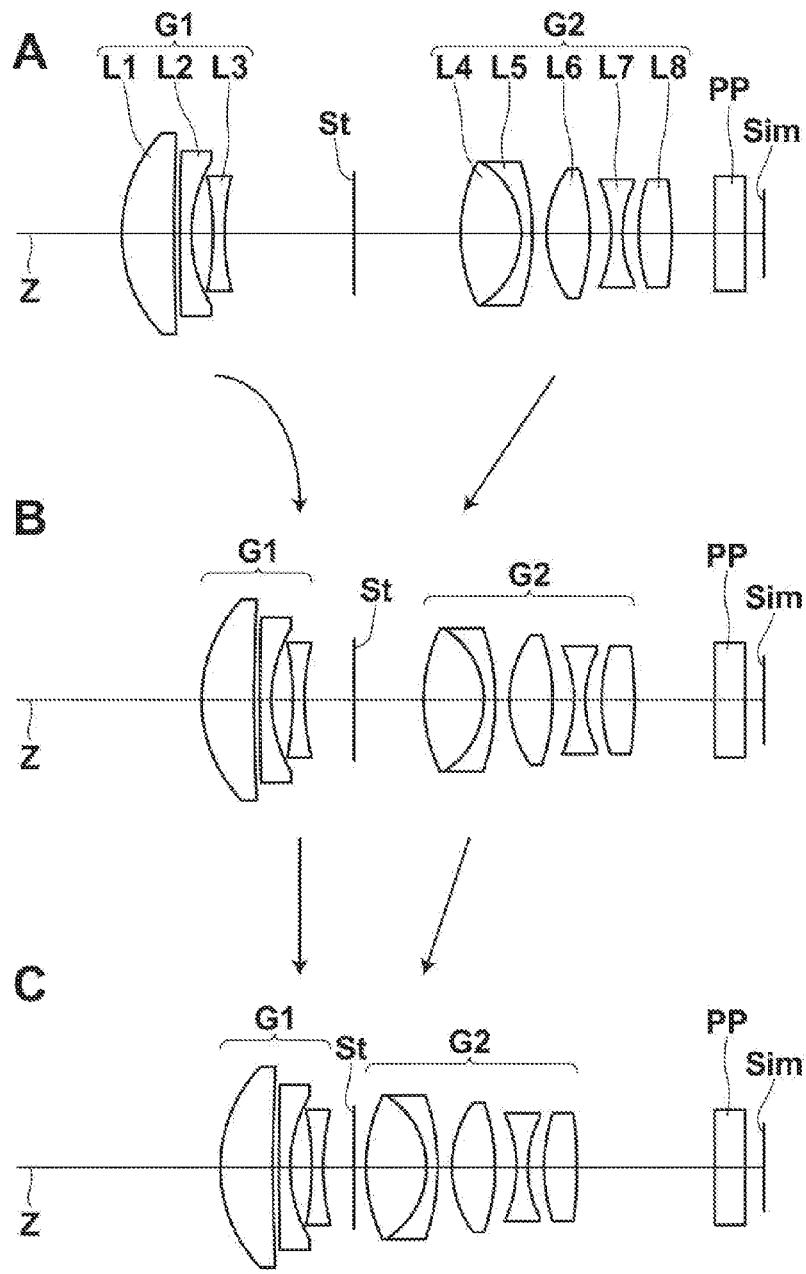
FIG. 8, Sections A through C are cross sections illustrating the lens structure of a variable magnification optical system in Example 7 of the present invention at a wide-angle end, in a middle focal length state, and at a telephoto end, respectively.
Figure 9:
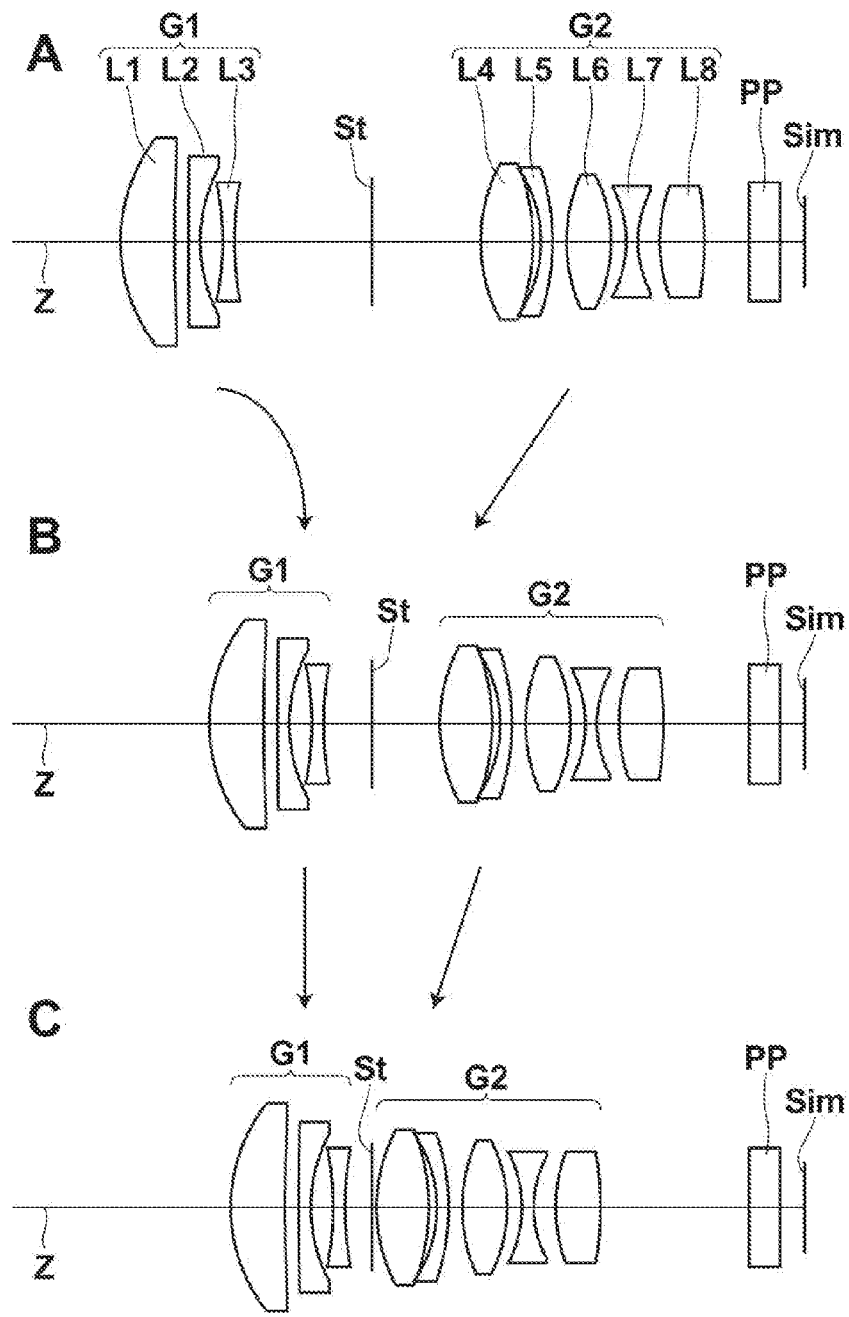
FIG. 9, Sections A through C are cross sections illustrating the lens structure of a variable magnification optical system in Example 8 of the present invention at a wide-angle end, in a middle focal length state, and at a telephoto end, respectively.
Figure 10:
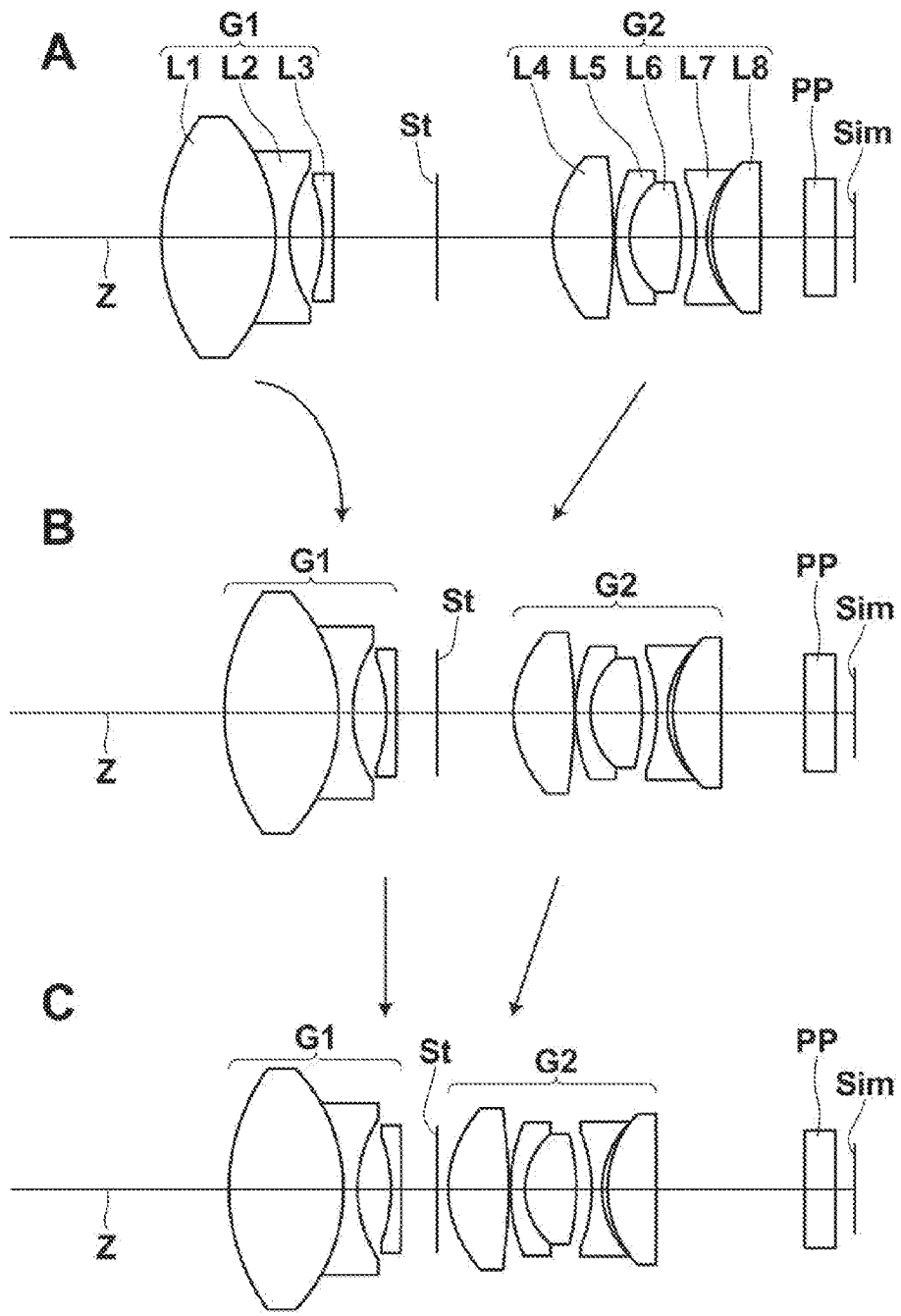
FIG. 10, Sections A through C are cross sections illustrating the lens structure of a variable magnification optical system in Example 9 of the present invention at a wide-angle end, in a middle focal length state, and at a telephoto end, respectively.

Similarly, FIG. 3, Sections A through C, FIG. 4, Sections A through C, FIG. 5, Sections A through C, FIG. 6, Sections A through C, FIG. 7, Sections A through C, FIG. 8, Sections A through C, FIG. 9, Sections A through C, FIG. 10, Sections A through C and FIG. 11, Sections A through C illustrate arrangement of lenses of the variable magnification optical systems at a wide-angle end, in a middle focal length state, a telephoto end in Examples 2 through 10, respectively.

The upper section of Table 1 shows basic lens data on a variable magnification optical system in Example 1, and the lower section of Table 1 shows data on variable magnification. Similarly, Table 3, Table 5, Table 7, Table 9, Table 11, Table 13, Table 14, Table 15 and Table 17 show data on the variable magnification optical systems in Examples 2 through 10. Table 2, Table 4, Table 6, Table 8, Table 10, Table 12 and Table 16 show aspheric coefficients for variable magnification optical systems in Examples 1 through 6 and 9, which include an aspherical surface. Next, the meanings of signs in the tables will be described, using the tables of Example 1 as an example. The meaning of the signs in the tables of Examples 2 through 10 are basically similar.

In the basic lens data in the upper section of Table 1, the column of Si shows the surface numbers of i-th (i= 1, 2, 3, . . . ) surfaces. The surface number of the most object-side surface of elements is the first surface, and the surface numbers sequentially increase toward the image side. The column of Ri shows the curvature radius of the i-th surface. The column of Di shows a distance, on optical axis Z, between the i-th surface and the (i+1)th surface. The column of Ndi shows the refractive index of a medium between the i-th surface and the (i+1)th surface for d-line (wavelength is 587.6 nm), and the column of νdj shows the Abbe number of the j-th (j=1, 2, 3, . . . ) optical element for d-line when the most object-side optical element is the first optical element, and the value of j sequentially increases toward the image side.

The sign of a curvature radius is positive when the shape of a surface is convex toward the object side, and negative when the shape of a surface is convex toward the image side. The basic lens data include aperture stop St and optical member PP. The sign "∞ (APERTURE STOP)" is written for a surface corresponding to aperture stop St in the column of Ri. Further, the sign "∞ (IMAGE PLANE)" is written for a surface corresponding to an image plane in the column of Ri.

In the basic lens data of Table 1, "VARIABLE 1", "VARIABLE 2" and "VARIABLE 3" are written in the rows of surface distances that change when magnification is changed. Variable 1 is a distance between first lens group G1 and aperture stop St, and variable 2 is a distance between aperture stop St and second lens group G2, and variable 3 is a distance between second lens group G2 and optical member PP.

The data on variable magnification in the lower section of Table 1 show variable 1, variable 2, variable 3, the focal length of the entire system, back focus Bf', F-number (Fno.), full angle of view 2ω at a wide-angle end, in a middle focal length state and at a telephoto end. In the basic lens data and the data on variable magnification, degree is used as the unit of angle, and mm is used as the unit of length. However, since an optical system can be used by proportionally enlarging or reducing the optical system, other appropriate units may be used.

In the basic lens data of Table 1, mark * is attached to the surface number of an aspherical surface. Table 1 shows, as the curvature radius of the aspherical surface, the numerical value of a paraxial curvature radius. Table 2 shows aspheric coefficients about the aspherical surfaces. In the numerical values of Table 2, "E−n" (n: integer) means "×10$^{-n}$". The aspheric coefficients are values of coefficients κ, Am (m=4, 6, 8, 10) in an aspherical equation represented by the following equation (A). Here, Σ in equation (A) represents a sum about the term of m (m=4, 6, 8, 10).

$$Zd = C \cdot h^2 / \{1 + (1 - \kappa \cdot C^2 \cdot h^2)^{1/2}\} + \Sigma Am \cdot h^m \quad \text{(A)},$$

where

Zd: depth of aspherical surface (the length of a perpendicular from a point on the aspherical surface at height h to a flat plane that contacts with the vertex of the aspherical surface and is perpendicular to the optical axis), h: height (the length from the optical axis to the lens surface), C: paraxial curvature, and κ, Am: aspheric coefficients (m=4, 6, 8, 10).

TABLE 1

EXAMPLE 1

| Si | Ri | Di | Ndi | ν dj |
|---|---|---|---|---|
| 1 | 10.722 | 3.643 | 1.76182 | 26.5 |
| 2 | 227.249 | 0.927 | 1.00000 | |
| 3 | 172.860 | 0.800 | 1.85026 | 32.3 |
| 4 | 8.975 | 1.500 | 1.00000 | |
| 5 | −12.318 | 0.800 | 1.69895 | 30.1 |
| 6 | 40.851 | VARIABLE 1 | 1.00000 | |
| 7 | ∞(APERTURE STOP) | VARIABLE 2 | 1.00000 | |
| 8* | 6.699 | 3.500 | 1.56867 | 58.6 |
| 9* | −22.859 | 0.184 | 1.00000 | |
| 10 | 13.388 | 0.687 | 1.80516 | 25.4 |
| 11 | 5.821 | 0.206 | 1.00000 | |
| 12 | 6.301 | 3.982 | 1.49700 | 81.6 |
| 13 | −5.818 | 0.798 | 1.59551 | 39.2 |
| 14 | 6.033 | 0.835 | 1.00000 | |
| 15 | 8.006 | 2.100 | 1.84666 | 23.8 |
| 16 | −103102.77 | VARIABLE 3 | 1.00000 | |
| 17 | ∞ | 2.100 | 1.51633 | 64.1 |
| 18 | ∞ | 2.992 | 1.00000 | |
| 19 | ∞(IMAGE PLANE) | | | |

TABLE 1-continued

EXAMPLE 1

|  | WIDE-ANGLE END | MIDDLE | TELE-PHOTO END |
|---|---|---|---|
| VARIABLE 1 | 6.817 | 2.449 | 2.081 |
| VARIABLE 2 | 8.268 | 5.504 | 1.223 |
| VARIABLE 3 | 3.000 | 5.764 | 10.045 |
| FOCAL LENGTH | 8.954 | 13.793 | 21.301 |
| Bf | 2.992 | 2.992 | 2.992 |
| Fno. | 1.60 | 1.96 | 2.97 |
| 2ω | 41.98 | 25.67 | 16.28 |

TABLE 2

EXAMPLE 1

| SURFACE | κ | A4 | A6 | A8 | A10 |
|---|---|---|---|---|---|
| 8* | −9.77167E−02 | 9.50192E−05 | 9.50678E−07 | −3.43045E−09 | −5.39369E−13 |
| 9* | −3.33109E−01 | 1.41569E−04 | −1.69583E−06 | 3.14254E−09 | 5.08034E−13 |

TABLE 3

EXAMPLE 2

| Si | Ri | Di | Ndi | ν dj |
|---|---|---|---|---|
| 1 | 10.677 | 4.003 | 1.80000 | 29.9 |
| 2 | 118.521 | 0.786 | 1.00000 | |
| 3 | 540.470 | 0.800 | 1.80100 | 35.0 |
| 4 | 8.083 | 1.717 | 1.00000 | |
| 5 | −13.586 | 0.800 | 1.80610 | 40.9 |
| 6 | 78.381 | VARIABLE 1 | 1.00000 | |
| 7 | ∞(APERTURE STOP) | VARIABLE 2 | 1.00000 | |
| 8* | 8.410 | 4.068 | 1.56867 | 58.6 |
| 9* | −26.379 | 0.146 | 1.00000 | |
| 10 | 10.783 | 0.781 | 1.80810 | 22.8 |
| 11 | 5.858 | 4.000 | 1.49700 | 81.6 |
| 12 | −14.956 | 1.505 | 1.00000 | |
| 13 | −13.657 | 0.781 | 1.80610 | 33.3 |
| 14 | 7.781 | 0.941 | 1.00000 | |
| 15 | 10.168 | 2.050 | 1.84666 | 23.8 |
| 16 | −29.420 | VARIABLE 3 | 1.00000 | |
| 17 | ∞ | 2.100 | 1.51633 | 64.1 |
| 18 | ∞ | 1.289 | 1.00000 | |
| 19 | ∞(IMAGE PLANE) | | | |

|  | WIDE-ANGLE END | MIDDLE | TELE-PHOTO END |
|---|---|---|---|
| VARIABLE 1 | 7.634 | 2.899 | 2.376 |
| VARIABLE 2 | 8.507 | 5.751 | 1.158 |
| VARIABLE 3 | 3.000 | 5.756 | 10.349 |
| FOCAL LENGTH | 9.111 | 13.366 | 21.182 |
| Bf | 1.289 | 1.289 | 1.289 |
| Fno. | 1.63 | 1.94 | 3.00 |
| 2ω | 41.64 | 26.61 | 16.37 |

TABLE 4

EXAMPLE 2

| SURFACE | κ | A4 | A6 | A8 | A10 |
|---|---|---|---|---|---|
| 8* | −2.43278E−01 | 2.11973E−05 | 4.36979E−07 | 2.46966E−10 | 3.45515E−14 |
| 9* | 7.89988E−01 | 1.55252E−04 | −4.96878E−07 | −2.12470E−10 | −2.83490E−14 |

TABLE 5

EXAMPLE 3

| Si | Ri | Di | Ndi | ν dj |
|---|---|---|---|---|
| 1 | 13.301 | 5.005 | 1.66680 | 33.0 |
| 2 | −694.201 | 1.137 | 1.00000 | |
| 3 | 25847.337 | 1.704 | 1.83481 | 42.7 |
| 4 | 12.121 | 2.330 | 1.00000 | |
| 5 | −14.249 | 1.092 | 1.83481 | 42.7 |
| 6 | 46.097 | VARIABLE 1 | 1.00000 | |
| 7 | ∞(APERTURE STOP) | VARIABLE 2 | 1.00000 | |
| 8* | 6.825 | 4.458 | 1.56867 | 58.6 |
| 9* | −53.359 | 0.146 | 1.00000 | |

TABLE 5-continued

EXAMPLE 3

| | | | | |
|---|---|---|---|---|
| 10 | 9.616 | 0.700 | 1.80518 | 25.4 |
| 11 | 4.659 | 3.500 | 1.49700 | 81.6 |
| 12 | −13.496 | 1.029 | 1.00000 | |
| 13 | −8.743 | 0.700 | 1.60342 | 38.0 |
| 14 | 5.851 | 0.691 | 1.00000 | |
| 15 | 7.519 | 2.970 | 1.84666 | 23.8 |
| 16 | −375.393 | VARIABLE 3 | 1.00000 | |
| 17 | ∞ | 2.100 | 1.51633 | 64.1 |
| 18 | ∞ | 1.159 | 1.00000 | |
| 19 | ∞(IMAGE PLANE) | | | |

|  | WIDE-ANGLE END | MIDDLE | TELE-PHOTO END |
|---|---|---|---|
| VARIABLE 1 | 7.664 | 3.462 | 3.276 |
| VARIABLE 2 | 8.112 | 5.384 | 0.836 |
| VARIABLE 3 | 3.000 | 5.728 | 10.276 |
| FOCAL LENGTH | 8.735 | 13.452 | 21.313 |
| Bf | 1.159 | 1.159 | 1.159 |
| Fno. | 1.63 | 2.02 | 3.18 |
| 2ω | 43.22 | 26.44 | 16.30 |

TABLE 6

EXAMPLE 3

| SURFACE | κ | A4 | A6 | A8 | A10 |
|---|---|---|---|---|---|
| 8* | 4.25086E−01 | −7.50204E−05 | −8.25173E−07 | −2.14419E−09 | −3.36923E−13 |
| 9* | −5.47422E+00 | 1.32666E−04 | −2.29791E−06 | 8.14403E−10 | 1.42451E−13 |

TABLE 7

EXAMPLE 4

| Si | Ri | Di | Ndi | ν dj |
|---|---|---|---|---|
| 1 | 10.040 | 3.643 | 1.85026 | 32.3 |
| 2 | 139.288 | 0.300 | 1.00000 | |
| 3 | 114.314 | 0.800 | 1.85026 | 32.3 |
| 4 | 10.315 | 1.603 | 1.00000 | |
| 5 | −22.092 | 0.800 | 1.83481 | 42.7 |
| 6 | 14.898 | VARIABLE 1 | 1.00000 | |
| 7 | ∞(APERTURE STOP) | VARIABLE 2 | 1.00000 | |
| 8* | 11.044 | 4.000 | 1.61800 | 63.4 |
| 9* | −6.021 | 0.782 | 1.83481 | 42.7 |
| 10 | −16.759 | 0.704 | 1.00000 | |
| 11 | 8.098 | 3.000 | 1.49700 | 81.6 |
| 12 | −12.860 | 1.371 | 1.00000 | |
| 13 | −8.800 | 0.782 | 1.71736 | 29.5 |
| 14 | 6.910 | 1.463 | 1.00000 | |
| 15 | 11.156 | 2.320 | 1.84666 | 23.8 |

TABLE 7-continued

EXAMPLE 4

| Si | Ri | Di | Ndi | ν dj |
|---|---|---|---|---|
| 16 | −44.280 | VARIABLE 3 | 1.00000 | |
| 17 | ∞ | 2.100 | 1.51633 | 64.1 |
| 18 | ∞ | 1.554 | 1.00000 | |
| 19 | ∞(IMAGE PLANE) | | | |

| | WIDE-ANGLE END | MIDDLE | TELE-PHOTO END |
|---|---|---|---|
| VARIABLE 1 | 10.187 | 4.110 | 2.451 |
| VARIABLE 2 | 7.386 | 4.821 | 0.848 |
| VARIABLE 3 | 3.000 | 5.565 | 9.538 |
| FOCAL LENGTH | 9.271 | 14.278 | 22.034 |
| Bf | 1.554 | 1.554 | 1.554 |
| Fno. | 1.69 | 1.99 | 2.75 |
| 2ω | 42.49 | 26.50 | 16.58 |

TABLE 8

EXAMPLE 4

| SURFACE | κ | A4 | A6 | A8 | A10 |
|---|---|---|---|---|---|
| 8* | 1.00000E+00 | 0.00000E+00 | 0.00000E+00 | 0.00000E+00 | 0.00000E+00 |
| 9* | 1.00000E+00 | 0.00000E+00 | 0.00000E+00 | 0.00000E+00 | 0.00000E+00 |

TABLE 9

EXAMPLE 5

| Si | Ri | Di | Ndi | ν dj |
|---|---|---|---|---|
| 1 | 15.087 | 7.800 | 1.80100 | 35.0 |
| 2 | −10.159 | 0.960 | 1.77250 | 49.6 |
| 3 | 10.159 | 1.500 | 1.00000 | |
| 4 | −11.687 | 0.700 | 1.00000 | 29.5 |
| 5 | 76.150 | VARIABLE 1 | 1.80610 | |
| 6 | ∞(APERTURE STOP) | VARIABLE 2 | 1.00000 | |
| 7* | 7.076 | 4.140 | 1.56867 | 58.6 |
| 8* | −27.890 | 0.100 | 1.00000 | |
| 9 | 11.546 | 1.000 | 1.84666 | 23.8 |
| 10 | 4.914 | 3.500 | 1.49700 | 81.6 |
| 11 | −14.367 | 1.038 | 1.00000 | |
| 12 | −10.705 | 0.700 | 1.63930 | 44.9 |
| 13 | 6.364 | 0.380 | 1.00000 | |
| 14 | 7.490 | 3.310 | 1.84666 | 23.8 |
| 15 | −426.615 | VARIABLE 3 | 1.00000 | |
| 16 | ∞ | 2.100 | 1.51633 | 64.1 |
| 17 | ∞ | 1.298 | 1.00000 | |
| 18 | ∞(IMAGE PLANE) | | | |

| | WIDE-ANGLE END | MIDDLE | TELE-PHOTO END |
|---|---|---|---|
| VARIABLE 1 | 7.652 | 3.280 | 2.904 |
| VARIABLE 2 | 7.873 | 5.219 | 0.796 |
| VARIABLE 3 | 3.000 | 5.654 | 10.077 |
| FOCAL LENGTH | 9.219 | 14.198 | 22.495 |
| Bf | 1.298 | 1.298 | 1.298 |
| Fno. | 1.67 | 2.07 | 3.21 |
| 2ω | 41.24 | 24.89 | 15.37 |

TABLE 10

EXAMPLE 5

| SURFACE | κ | A4 | A6 | A8 | A10 |
|---|---|---|---|---|---|
| 7* | 3.69792E−01 | −9.02045E−05 | 1.63733E−07 | 4.46650E−12 | −2.38858E−16 |
| 8* | 8.82358E−01 | 1.46975E−04 | −2.33209E−07 | −1.34525E−11 | −5.15386E−16 |

TABLE 11

EXAMPLE 6

| Si | Ri | Di | Ndi | ν dj |
|---|---|---|---|---|
| 1 | 13.706 | 6.000 | 1.80610 | 33.3 |
| 2 | −358.139 | 0.515 | 1.00000 | |
| 3 | 134.216 | 1.230 | 1.83481 | 42.7 |
| 4 | 10.261 | 1.480 | 1.00000 | |
| 5 | −12.369 | 1.460 | 1.83481 | 42.7 |
| 6 | 53.063 | VARIABLE 1 | 1.00000 | |
| 7 | ∞(APERTURE STOP) | VARIABLE 2 | 1.00000 | |
| 8* | 6.998 | 4.140 | 1.56867 | 58.6 |
| 9* | −27.674 | 0.100 | 1.00000 | |
| 10 | 11.595 | 1.000 | 1.84666 | 23.8 |
| 11 | 4.914 | 3.500 | 1.49700 | 81.6 |
| 12 | −14.179 | 1.038 | 1.00000 | |
| 13 | −10.21 | 0.700 | 1.63930 | 44.9 |
| 14 | 6.364 | 0.386 | 1.00000 | |
| 15 | 7.517 | 3.310 | 1.84666 | 23.8 |
| 16 | −194.003 | VARIABLE 3 | 1.00000 | |
| 17 | ∞ | 2.100 | 1.51633 | 64.1 |
| 18 | ∞ | 1.409 | 1.00000 | |
| 19 | ∞(IMAGE PLANE) | | | |

| | WIDE-ANGLE END | MIDDLE | TELE-PHOTO END |
|---|---|---|---|
| VARIABLE 1 | 7.318 | 3.300 | 3.134 |
| VARIABLE 2 | 7.708 | 4.958 | 0.741 |
| VARIABLE 3 | 3.000 | 5.750 | 9.967 |
| FOCAL LENGTH | 9.439 | 14.537 | 22.352 |
| Bf | 1.409 | 1.409 | 1.409 |
| Fno. | 1.66 | 2.07 | 3.16 |
| 2ω | 42.05 | 25.54 | 16.27 |

TABLE 12

EXAMPLE 6

| SURFACE | κ | A4 | A6 | A8 | A10 |
|---|---|---|---|---|---|
| 8* | −4.51517E−01 | 1.91254E−04 | −6.16837E−07 | −5.22454E−09 | −8.48001E−13 |
| 9* | −7.06718E−01 | 1.39683E−04 | −2.25255E−06 | 2.07530E−09 | 3.30173E−13 |

TABLE 13

EXAMPLE 7

| Si | Ri | Di | Ndi | ν dj |
|---|---|---|---|---|
| 1 | 10.172 | 3.643 | 1.85026 | 32.3 |
| 2 | 132.378 | 0.401 | 1.00000 | |
| 3 | 172.699 | 0.800 | 1.83400 | 37.2 |
| 4 | 9.838 | 1.500 | 1.00000 | |
| 5 | −20.243 | 0.800 | 1.80610 | 40.9 |
| 6 | 16.358 | VARIABLE 1 | 1.00000 | |
| 7 | ∞(APERTURE STOP) | VARIABLE 2 | 1.00000 | |
| 8 | 11.374 | 4.190 | 1.61800 | 63.4 |
| 9 | −5.852 | 0.782 | 1.83481 | 42.7 |
| 10 | −15.031 | 0.986 | 1.00000 | |
| 11 | 7.617 | 3.000 | 1.49700 | 81.6 |
| 12 | −13.700 | 1.484 | 1.00000 | |
| 13 | −8.950 | 0.782 | 1.84666 | 23.8 |
| 14 | 7.530 | 1.137 | 1.00000 | |

TABLE 13-continued

EXAMPLE 7

| Si | Ri | Di | Ndi | ν dj |
|---|---|---|---|---|
| 15 | 12.024 | 2.285 | 1.92286 | 18.9 |
| 16 | −27.535 | VARIABLE 3 | 1.00000 | |
| 17 | ∞ | 2.100 | 1.51633 | 64.1 |
| 18 | ∞ | 1.324 | 1.00000 | |
| 19 | ∞(IMAGE PLANE) | | | |

| | WIDE-ANGLE END | MIDDLE | TELE-PHOTO END |
|---|---|---|---|
| VARIABLE 1 | 9.173 | 3.446 | 2.141 |
| VARIABLE 2 | 7.403 | 4.822 | 0.824 |
| VARIABLE 3 | 3.000 | 5.581 | 9.579 |
| FOCAL LENGTH | 9.173 | 14.127 | 21.801 |
| Bf | 1.324 | 1.324 | 1.324 |
| Fno. | 1.72 | 2.05 | 2.87 |
| 2ω | 42.77 | 25.32 | 15.92 |

TABLE 14

EXAMPLE 8

| Si | Ri | Di | Ndi | ν dj |
|---|---|---|---|---|
| 1 | 11.394 | 3.643 | 1.85026 | 32.3 |
| 2 | 125.302 | 0.921 | 1.00000 | |
| 3 | 302.858 | 0.800 | 1.85026 | 32.3 |
| 4 | 10.611 | 1.500 | 1.00000 | |

TABLE 14-continued

EXAMPLE 8

| Si | Ri | Di | Ndi | ν dj |
|---|---|---|---|---|
| 5 | −19.968 | 0.800 | 1.83481 | 42.7 |
| 6 | 22.408 | VARIABLE 1 | 1.00000 | |
| 7 | ∞(APERTURE STOP) | VARIABLE 2 | 1.00000 | |
| 8 | 11.246 | 3.500 | 1.72916 | 54.7 |
| 9 | −14.294 | 0.545 | 1.00000 | |
| 10 | −8.734 | 0.782 | 1.81518 | 25.4 |
| 11 | −15.433 | 0.930 | 1.00000 | |
| 12 | 11.34 | 3.000 | 1.49700 | 81.6 |
| 13 | −9.934 | 0.997 | 1.00000 | |
| 14 | −7.991 | 0.782 | 1.68893 | 31.1 |
| 15 | 7.227 | 1.480 | 1.00000 | |

TABLE 14-continued

EXAMPLE 8

| | | | | |
|---|---|---|---|---|
| 16 | 10.817 | 3.000 | 1.80000 | 29.9 |
| 17 | −22.726 | VARIABLE 3 | 1.00000 | |
| 18 | ∞ | 2.100 | 1.51633 | 64.1 |
| 19 | ∞ | 1.612 | 1.00000 | |
| 20 | ∞(IMAGE PLANE) | | | |

| | WIDE-ANGLE END | MIDDLE | TELE-PHOTO END |
|---|---|---|---|
| VARIABLE 1 | 9.212 | 3.235 | 1.797 |
| VARIABLE 2 | 7.294 | 4.554 | 0.310 |
| VARIABLE 3 | 3.000 | 5.740 | 9.984 |
| FOCAL LENGTH | 9.240 | 14.230 | 21.959 |
| Bf | 1.612 | 1.612 | 1.612 |
| Fno. | 1.71 | 1.99 | 2.85 |
| 2ω | 41.38 | 25.03 | 15.84 |

TABLE 15

EXAMPLE 9

| Si | Ri | Di | Ndi | νdj |
|---|---|---|---|---|
| 1 | 14.071 | 7.800 | 1.67003 | 47.3 |
| 2 | −12.056 | 0.960 | 1.61800 | 63.4 |
| 3 | 8.815 | 2.275 | 1.00000 | |
| 4 | −10.447 | 0.700 | 1.74400 | 44.8 |
| 5 | −286.458 | VARIABLE 1 | 1.00000 | |
| 6 | ∞(APERTURE STOP) | VARIABLE 2 | 1.00000 | |
| 7* | 7.076 | 4.140 | 1.56867 | 58.6 |
| 8* | −27.890 | 0.100 | 1.00000 | |
| 9 | 11.546 | 1.000 | 1.84666 | 23.8 |
| 10 | 4.914 | 3.500 | 1.49700 | 81.6 |
| 11 | −14.367 | 1.038 | 1.00000 | |
| 12 | −10.705 | 0.700 | 1.63930 | 44.9 |
| 13 | 6.364 | 0.380 | 1.00000 | |
| 14 | 7.490 | 3.310 | 1.84666 | 23.8 |
| 15 | −426.615 | VARIABLE 3 | 1.00000 | |
| 16 | ∞ | 2.100 | 1.51633 | 64.1 |
| 17 | ∞ | 1.330 | 1.00000 | |
| 18 | ∞(IMAGE PLANE) | | | |

| | WIDE-ANGLE END | MIDDLE | TELE-PHOTO END |
|---|---|---|---|
| VARIABLE 1 | 7.068 | 2.759 | 2.443 |
| VARIABLE 2 | 7.873 | 4.554 | 0.749 |
| VARIABLE 3 | 3.000 | 5.671 | 10.124 |
| FOCAL LENGTH | 9.429 | 14.520 | 23.006 |
| Bf | 1.330 | 1.330 | 1.330 |
| Fno. | 1.67 | 1.99 | 3.22 |
| 2ω | 39.80 | 24.26 | 15.01 |

TABLE 16

EXAMPLE 9

| SURFACE | κ | A4 | A6 | A8 | A10 |
|---|---|---|---|---|---|
| 7* | 3.69792E−01 | −9.02045E−05 | 1.63733E−07 | 4.46650E−12 | −2.38858E−16 |
| 8* | 8.82358E−01 | 1.46975E−04 | −2.33209E−07 | −1.34525E−11 | −5.15386E−16 |

TABLE 17

EXAMPLE 10

| Si | Ri | Di | Ndi | νdj |
|---|---|---|---|---|
| 1 | 10.983 | 3.643 | 1.80400 | 46.6 |
| 2 | 128.58 | 1.125 | 1.00000 | |
| 3 | 1784.235 | 0.800 | 1.77250 | 49.6 |
| 4 | 9.743 | 1.500 | 1.00000 | |
| 5 | −17.602 | 0.800 | 1.77250 | 49.6 |
| 6 | 22.225 | VARIABLE 1 | 1.00000 | |
| 7 | ∞(APERTURE STOP) | VARIABLE 2 | 1.00000 | |
| 8 | 11.579 | 3.500 | 1.72916 | 54.7 |
| 9 | −13.195 | 0.500 | 1.00000 | |
| 10 | −8.769 | 0.782 | 1.81518 | 25.4 |
| 11 | −16.176 | 1.323 | 1.00000 | |
| 12 | 10.821 | 3.000 | 1.49700 | 81.6 |
| 13 | −9.513 | 0.787 | 1.00000 | |
| 14 | −7.934 | 0.782 | 1.68893 | 31.1 |
| 15 | 7.639 | 1.499 | 1.00000 | |
| 16 | 11.253 | 2.299 | 1.80000 | 29.9 |
| 17 | −24.227 | VARIABLE 3 | 1.00000 | |
| 18 | ∞ | 2.100 | 1.51633 | 64.1 |
| 19 | ∞ | 1.854 | 1.00000 | |
| 20 | ∞(IMAGE PLANE) | | | |

| | WIDE-ANGLE END | MIDDLE | TELE-PHOTO END |
|---|---|---|---|
| VARIABLE 1 | 8.785 | 2.857 | 1.399 |
| VARIABLE 2 | 7.426 | 4.745 | 0.591 |
| VARIABLE 3 | 3.000 | 5.681 | 9.835 |
| FOCAL LENGTH | 9.228 | 14.211 | 21.946 |
| Bf | 1.854 | 1.854 | 1.854 |
| Fno. | 1.66 | 1.92 | 2.75 |
| 2ω | 41.75 | 25.14 | 15.86 |

Table 18 shows correspondence values for formulas (1) through (10) of the variable magnification optical systems in Examples 1 through 10. In all of the examples, d-line is a reference wavelength. The tables of data on variable magnification and the following Table 18 show values at the reference wavelength.

TABLE 18

| FORMULA | EXAMPLE 1 | EXAMPLE 2 | EXAMPLE 3 | EXAMPLE 4 | EXAMPLE 5 |
|---|---|---|---|---|---|
| (1), (1A) vd1 | 26.5 | 29.9 | 33.0 | 32.3 | 35.0 |
| (2) f1/fw | 1.638 | 1.584 | 2.247 | 1.355 | 0.953 |
| (3) f4/fG2 | 0.933 | 1.122 | 1.094 | 0.640 | 1.045 |
| (4) fG2F/fG2B | −0.528 | −0.253 | −0.344 | −0.449 | −0.314 |
| (5) vd7 − vd8 | 15.4 | 9.5 | 14.2 | 5.7 | 21.1 |
| (6) vd8 | 23.8 | 23.8 | 23.8 | 23.8 | 23.8 |
| (7) Rc/fw | −0.650 | 0.643 | 0.533 | −0.649 | 0.533 |
| (8) H1/H6 | 1.282 | 1.290 | 1.295 | 1.344 | 1.313 |
| (9) dw/fw | 1.685 | 1.772 | 1.806 | 1.895 | 1.684 |
| (10) LW/fW | 4.738 | 4.767 | 5.355 | 4.873 | 5.104 |

| FORMULA | EXAMPLE 6 | EXAMPLE 7 | EXAMPLE 8 | EXAMPLE 9 | EXAMPLE 10 |
|---|---|---|---|---|---|
| (1), (1A) vd1 | 33.3 | 32.3 | 32.3 | 47.3 | 46.6 |
| (2) f1/fw | 1.747 | 1.394 | 1.572 | 1.168 | 1.588 |
| (3) f4/fG2 | 1.035 | 0.655 | 0.816 | 1.045 | 0.811 |
| (4) fG2F/fG2B | −0.314 | −0.469 | −0.276 | −0.314 | −0.303 |
| (5) vd7 − vd8 | 21.1 | 4.9 | 1.2 | 21.1 | 16.7 |
| (6) vd8 | 23.8 | 18.9 | 29.9 | 23.8 | 29.9 |
| (7) Rc/fw | 0.521 | −0.638 | — | 0.521 | — |
| (8) H1/H6 | 1.323 | 1.330 | 1.323 | 1.294 | 1.348 |
| (9) dw/fw | 1.592 | 1.807 | 1.786 | 1.585 | 1.757 |
| (10) LW/fW | 4.840 | 4.786 | 4.890 | 4.938 | 4.854 |

FIG. 12, Sections A through I show aberration diagrams of the variable magnification optical system in Example 1. FIG. 12, Sections A, B and C illustrate a spherical aberration, curvature of field and distortion aberration (distortion) at a wide-angle end, respectively. FIG. 12, Sections D, E and F illustrate a spherical aberration, curvature of field and distortion aberration (distortion) in a middle focal length state, respectively. FIG. 12, Sections G, H and I illustrate a spherical aberration, curvature of field and distortion aberration (distortion) at a telephoto end, respectively.

In the diagram of the spherical aberration, an aberration for d-line is indicated by a solid line, and an aberration for g-line (wavelength of 435.8 nm) is indicated by a broken line. Further, an aberration for C-line (wavelength of 656.3 nm) is indicated by a dashed line. In the diagram of curvature of field, aberrations for d-line, g-line and C-line are illustrated, and an aberration in a sagittal direction is indicated by a solid line, and an aberration in a tangential direction is indicated by a broken line. The diagram of distortion aberration illustrates an aberration for d-line. The vertical axis of the diagram of a spherical aberration corresponds to F-number. In the diagrams of curvature of field and distortion, the vertical axis represents image height (unit is mm), and the minimum value of the vertical axis is 0.

Since the image height of 0 represents a position on an optical axis, the value of curvature of field in the sagittal direction and the value of curvature of field in the tangential direction at the image height of 0 are the same. In the diagram of curvature of field, aberration curves for wavelengths at the image height of 0 are positioned in the same order as aberration curves for wavelengths at the lowest position of the vertical axis in the diagram of a spherical aberration. For example, when aberration curves for d-line, g-line and C-line are positioned in this order from the left side at the lowest position of the vertical axis in the diagram of a spherical aberration, aberration curves at the position of the image height of 0 in the diagram of curvature of field in the same variable magnification state are positioned in a similar order, and an aberration curve in a sagittal direction and a tangential direction for d-line, an aberration curve in a sagittal direction and a tangential direction for g-line, and an aberration curve in a sagittal direction and a tangential direction for C-line are positioned in this order from the left side.

Here, the diagram of distortion is represented by TV distortion. When a planar object is perpendicular to an optical axis, and an optical system forms an image of the planar object, the degree of distortion of the object image in a direction perpendicular to the optical axis is represented as distortion. Lenses for photography and the like use a general numerical value obtained by dividing a difference between an ideal image height and an actual image height by the ideal image height, and by expressing the obtained value in percentage. However, the fields of TV lenses use a different definition expression, which is distinguished as TV distortion. According to the definition, an amount of curvature of a long side of a TV screen is used, as a target of a distortion amount.

Specifically, TV distortion DTV is obtained by dividing depth Δh of curvature of a long side by vertical screen length 2 h, and by expressing the obtained value in percentage. TV distortion DTV is represented by the following expression:

$DTV = \Delta h/2h \times 100.$

In a diagram of distortion, actual image height Y from an optical axis is lengths to four points in four diagonal directions of a screen from the optical axis, and a rectangular planar object on an object side of a planar image connecting the four points is assumed. An actual image height at the center of a long side of the image is h, and a difference from a perpendicular height of a point on a diagonal line to the optical axis is Δh. Therefore, the numerical value varies depending on the aspect ratio of a screen. In the diagrams of distortion illustrated in FIG. 12, Sections C, F and I, distortion is calculated based on the ratio of 3:4, which is a general ratio for a TV screen.

Similarly, FIG. 13, Sections A through I show aberration diagrams of the variable magnification optical system in Example 2 at a wide-angle end, in a middle focal length state, and at a telephoto end. FIG. 14, Sections A through I show aberration diagrams of the variable magnification optical system in Example 3 at a wide-angle end, in a middle focal length state, and at a telephoto end. FIG. 15, Sections A through I show aberration diagrams of the variable magnification optical system in Example 4 at a wide-angle end, in a middle focal length state, and at a telephoto end. FIG. 16, Sections A through I show aberration diagrams of the variable magnification optical system in Example 5 at a wide-angle end, in a middle focal length state, and at a telephoto end. FIG. 17, Sections A through I show aberration diagrams of the variable magnification optical system in Example 6 at a wide-angle end, in a middle focal length state, and at a telephoto end. FIG. 18, Sections A through I show aberration diagrams of the variable magnification optical system in Example 7 at a wide-angle end, in a middle focal length state, and at a telephoto end. FIG. 19, Sections A through I show aberration diagrams of the variable magnification optical system in Example 8 at a wide-angle end, in a middle focal length state, and at a telephoto end. FIG. 20, Sections A through I show aberration diagrams of the variable magnification optical system in Example 9 at a wide-angle end, in a middle focal length state, and at a telephoto end. FIG. 21, Sections A through I show aberration diagrams of the variable magnification optical system in Example 10 at a wide-angle end, in a middle focal length state, and at a telephoto end.

Figure 22:
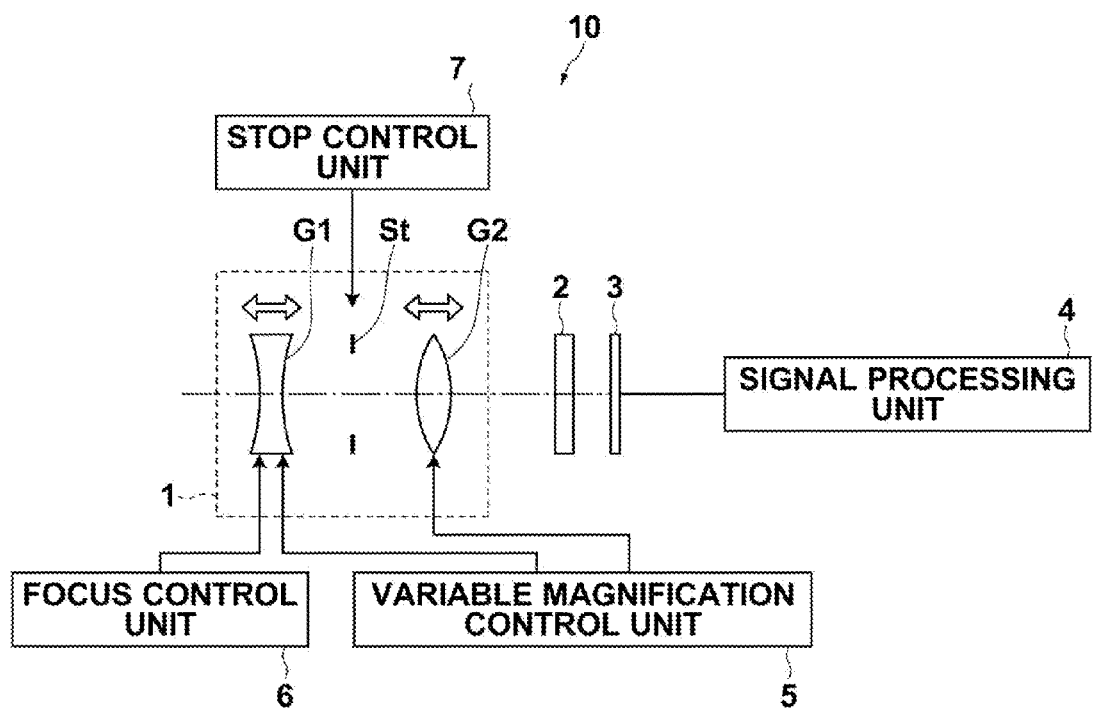
FIG. 22 is a schematic diagram illustrating the configuration of an imaging apparatus according to an embodiment of the present invention.

Next, an imaging apparatus according to an embodiment of the present invention will be described. FIG. 22 is a schematic diagram illustrating the configuration of an imaging apparatus 10 using the variable magnification optical system 1 according to an embodiment of the present invention, as an example of an imaging apparatus according to an embodiment of the present invention. The imaging apparatus is, for example, a surveillance camera, a video camera, an electronic still camera, or the like.

The imaging apparatus 10 illustrated in FIG. 22 includes the variable magnification optical system 1, a filter 2 arranged on the image side of the variable magnification optical system 1, an imaging device 3 that images an image of a subject formed by the variable magnification optical system, a signal processing unit 4 that performs operation processing on a signal output from the imaging device 3, a variable magnification control unit 5 for changing magnification of the variable magnification optical system 1, a focus control unit 6 for adjusting focus when magnification is changed or when a distance to an object fluctuates, and a stop control unit 7 for changing an aperture diameter of aperture stop St. In the example illustrated in FIG. 22, focus is adjusted by moving first lens group G1. However, the method for adjusting focus is not limited to this example. Further, structure in which the stop control unit 7 is omitted is possible.

So far, the present invention has been described by using embodiments and examples. However, the present invention is not limited to the embodiments nor the examples, and various modifications are possible. For example, values, such as the curvature radius of each lens element, distances between surfaces, refractive indices, Abbe numbers and aspheric coefficients, are not limited to the values in the numerical value examples, but may be other values.

What is claimed is:

1. A variable magnification optical system consisting of:
   a first lens group having negative refractive power;
   a stop; and
   a second lens group having positive refractive power, which are in this order from an object side,
   wherein a distance between the first lens group and the second lens group in an optical axis direction becomes shorter when magnification is changed from a wide-angle end to a telephoto end, and
   wherein the stop is fixed relative to an image plane during magnification change, and
   wherein the first lens group consists of a positive lens having a convex object-side surface and two negative lenses in this order from the object side, and
   wherein the second lens group consists of a double-convex lens, a negative meniscus lens, a double-convex lens, a double-concave lens and a positive lens, which are in this order from the object side,
   wherein the following formula (1) is satisfied:

$$25.5 < vd1 < 50 \quad (1),\ \text{where}$$

vd1: an Abbe number of the positive lens in the first lens group for d-line.

2. The variable magnification optical system, as defined in claim 1, wherein the following formula (2) is satisfied:

$$0.8 < f1/fw < 2.5 \quad (2),\ \text{where}$$

f1: a focal length of the positive lens in the first lens group, and
   fw: a focal length of the optical system at a wide-angle end.

3. The variable magnification optical system, as defined in claim 1, wherein the following formula (3) is satisfied:

$$0.5 < f4/fG2 < 1.3 \quad (3),\ \text{where}$$

f4: a focal length of the double-convex lens on the most object side in the second lens group, and
   fG2: a focal length of the second lens group.

4. The variable magnification optical system, as defined in claim 3, wherein the following formulas (4) through (6) are satisfied:

$$-0.6 < fG2F/fG2B < -0.2 \quad (4);$$
   $$0 < vd7 - vd8 < 25 \quad (5);\ \text{and}$$
   $$15 < vd8 < 33 \quad (6),\ \text{where}$$

fG2F: a combined focal length of three object-side lenses in the second lens group,
   fG2B: a combined focal length of two image-side lenses in the second lens group,
   vd7: an Abbe number of the double-concave lens in the second lens group for d-line, and
   vd8: an Abbe number of the positive lens in the second lens group for d-line.

5. The variable magnification optical system, as defined in claim 4, wherein the following formula (6-1) is satisfied:

$$20 < vd8 < 30 \quad (6\text{-}1).$$

6. The variable magnification optical system, as defined in claim 3, wherein the second lens group includes at least one cemented surface satisfying the following formula (7):

$$-0.75 < Rc/fw < 0.70 \quad (7),\ \text{where}$$

Rc: a curvature radius of a cemented surface, and
   fw: a focal length of the optical system at a wide-angle end.

7. The variable magnification optical system, as defined in claim 3, wherein the following formula (8) is satisfied:

$$1.2 < H1/H6 < 1.5 \quad (8),\ \text{where}$$

H1: a height of a marginal ray of axial rays on a most-object-side surface in the first lens group at a wide-angle end,
   H6: a height of a marginal ray of the axial rays on a most-image-side surface in the first lens group at a wide-angle end.

8. The variable magnification optical system, as defined in claim 3, wherein the following formulas (9) and (10) are satisfied:

$$1.4 < dw/fw < 2.2 \qquad (9); \text{ and}$$

$$4.5 < Lw/fw < 5.6 \qquad (10), \text{ where}$$

dw: a distance on an optical axis between the first lens group and the second lens group at a wide-angle end, fw: a focal length of the optical system at a wide-angle end, and Lw: an lens length at a wide-angle end.

9. The variable magnification optical system, as defined in claim 1, wherein the following formulas (4) through (6) are satisfied:

$$-0.6 < fG2F/fG2B < -0.2 \qquad (4);$$

$$0 < vd7 - vd8 < 25 \qquad (5); \text{ and}$$

$$15 < vd8 < 33 \qquad (6), \text{ where}$$

fG2F: a combined focal length of three object-side lenses in the second lens group, fG2B: a combined focal length of two image-side lenses in the second lens group, vd7: an Abbe number of the double-concave lens in the second lens group for d-line, and vd8: an Abbe number of the positive lens in the second lens group for d-line.

10. The variable magnification optical system, as defined in claim 9, wherein the following formula (6-1) is satisfied:

$$20 < vd8 < 30 \qquad (6\text{-}1).$$

11. The variable magnification optical system, as defined in claim 1, wherein the second lens group includes at least one cemented surface satisfying the following formula (7):

$$-0.75 < Rc/fw < 0.70 \qquad (7), \text{ where}$$

Rc: a curvature radius of a cemented surface, and fw: a focal length of the optical system at a wide-angle end.

12. The variable magnification optical system, as defined in claim 1, wherein the following formula (8) is satisfied:

$$1.2 < H1/H6 < 1.5 \qquad (8), \text{ where}$$

H1: a height of a marginal ray of axial rays on a most-object-side surface in the first lens group at a wide-angle end, H6: a height of a marginal ray of the axial rays on a most-image-side surface in the first lens group at a wide-angle end.

13. The variable magnification optical system, as defined in claim 1, wherein the following formulas (9) and (10) are satisfied:

$$1.4 < dw/fw < 2.2 \qquad (9); \text{ and}$$

$$4.5 < Lw/fw < 5.6 \qquad (10), \text{ where}$$

dw: a distance on an optical axis between the first lens group and the second lens group at a wide-angle end, fw: a focal length of the optical system at a wide-angle end, and Lw: an lens length at a wide-angle end.

14. The variable magnification optical system, as defined in claim 1, wherein the following formula (1-1) is satisfied:

$$29 < vd1 < 40 \qquad (1\text{-}1).$$

15. The variable magnification optical system, as defined in claim 1, wherein the following formula (2-1) is satisfied:

$$1.0 < f1/fw < 2.0 \qquad (2\text{-}1), \text{ where}$$

f1: a focal length of the positive lens in the first lens group, and fw: a focal length of the optical system at a wide-angle end.

16. An imaging apparatus comprising:

the variable magnification optical system, as defined in claim 1; and an imaging device that images an optical image formed by the variable magnification optical system, and outputs electrical signals.

\* \* \* \* \*